(12) United States Patent
Song et al.

(10) Patent No.: US 12,154,694 B2
(45) Date of Patent: Nov. 26, 2024

(54) MAGNETIC CONFINEMENT FUSION REACTOR

(71) Applicant: HEFEI INSTITUTES OF PHYSICAL SCIENCE, CHINESE ACADEMY OF SCIENCES, Hefei (CN)

(72) Inventors: Yuntao Song, Hefei (CN); Jinxing Zheng, Hefei (CN); Xuebing Peng, Hefei (CN); Jinggang Qin, Hefei (CN); Kun Lu, Hefei (CN); Xufeng Liu, Hefei (CN); Shijun Qin, Hefei (CN); Mingzhun Lei, Hefei (CN); Qingxi Yang, Hefei (CN); Chen Liu, Hefei (CN); Yong Cheng, Hefei (CN); Jian Ge, Hefei (CN); Qingquan Zhang, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 18/658,993

(22) Filed: May 9, 2024

(65) Prior Publication Data
US 2024/0290505 A1 Aug. 29, 2024

(30) Foreign Application Priority Data
Dec. 25, 2023 (CN) .......................... 202311792221.2

(51) Int. Cl.
*G21B 1/05* (2006.01)
*G21B 1/13* (2006.01)
*G21B 1/17* (2006.01)

(52) U.S. Cl.
CPC .................. *G21B 1/05* (2013.01); *G21B 1/13* (2013.01); *G21B 1/17* (2013.01); *G21B 1/057* (2013.01)

(58) Field of Classification Search
CPC ... G21B 1/05; G21B 1/13; G21B 1/17; G21B 1/057
(Continued)

(56) References Cited

U.S. PATENT DOCUMENTS
2020/0168349 A1 5/2020 Hampshire

FOREIGN PATENT DOCUMENTS
| CN | 1229255 A | 9/1999 |
|---|---|---|
| CN | 101443853 A | 5/2009 |

(Continued)

OTHER PUBLICATIONS

Jiangang Li et al., "Main engine design of fusion engineering experimental reactor", Science Press, 2016, Contents and pp. 1-3, 34, 68, 105, 129-133, 170, 226.

(Continued)

*Primary Examiner* — Jack W Keith
*Assistant Examiner* — Daniel Wasil

(57) ABSTRACT

A magnetic confinement fusion reactor includes a host hall, and a host including a Dewar system, a cold shield system, a superconducting magnet system, a vacuum chamber system, a divertor system, a blanket system, a remote operation system, and a maintenance system. The superconducting magnet system includes a central solenoid magnet, a poloidal field magnet, and a toroidal field magnet. The central solenoid magnet is configured to provide necessary volt-seconds. The poloidal field magnet is configured to generate a poloidal magnetic field. The toroidal field magnet is configured to generate a toroidal magnetic field. The plasma is confined by the toroidal magnetic field and the poloidal magnetic field. The vacuum chamber system is provided with a neutron shielding block to protect the superconducting magnets from being damaged by fusion neutrons.

62 Claims, 13 Drawing Sheets

(58) Field of Classification Search
USPC .................................................. 376/133, 134
See application file for complete search history.

(56) References Cited

FOREIGN PATENT DOCUMENTS

| CN | 102543222 A |   | 7/2012  |             |
|----|-------------|---|---------|-------------|
| CN | 105575444 A |   | 5/2016  |             |
| CN | 106463182 A |   | 2/2017  |             |
| CN | 108172309 A |   | 6/2018  |             |
| CN | 110293281 A |   | 10/2019 |             |
| CN | 112309588 A |   | 2/2021  |             |
| CN | 113539524 A |   | 10/2021 |             |
| CN | 116072372 A | * | 5/2023  | ... G21B 1/05 |
| JP | S5676512 A  |   | 6/1981  |             |
| JP | H09304565 A |   | 11/1997 |             |

OTHER PUBLICATIONS

Zhengshuo Zhang et al., "Stability Analysis of High-Performance Nb3Sn CICC Conductor in China Fusion Engineering Testing Reactor Toroidal Field Superconducting Magnets", Transactions of China Electrotechnical Society, Dec. 2020, vol. 35, No. 24, pp. 5031-5041.

Yuntao Song et al., "Qualification of the Weld for ITER PF6 Coil Tail", IEEE Transactions On Applied Superconductivity, 2019, vol. 29, No. 7, pp. 1-8.

Ciazynski Danie et al., "Analysis of the Early Quench Development in JT-60SA Toroidal Field Coils Tested in the Cold Test Facility", IEEE Transactions On Applied Superconductivity, 2018, vol. 28, No. 3, pp. 1-5.

* cited by examiner

MAGNETIC CONFINEMENT FUSION REACTOR

CROSS-REFERENCE TO RELATED APPLICATIONS

This application claims the benefit of priority from Chinese Patent Application No. 202311792221.2, filed on Dec. 25, 2023. The content of the aforementioned application, including any intervening amendments thereto, is incorporated herein by reference in its entirety.

TECHNICAL FIELD

This application relates generally to magnetic confinement fusion energy, and more particularly to a magnetic confinement fusion reactor.

BACKGROUND

The Industrial revolution brought a sharp increase in the energy demand. The current energy source is still predominated by non-renewable fossil fuels, and the continuous consumption of fossil fuels not only makes the energy crisis issue increasingly severe, but also causes serious environmental pollution. Although some renewable energy sources, such as hydroelectric, solar, and wind energy, have been demonstrated as clean alternatives to the fossil fuels, they still fail to meet the current needs. Controlled fusion energy has unlimited potential and various advantages, such as safety, cleanliness, and wide fuel sources, and is considered as the most promising solution for solving the future energy problems. The magnetic confinement nuclear fusion devices require harsh reaction conditions (such as ultra-high temperature and high pressure), and the fusion reaction will stop once the reaction conditions are not met. The inappropriate operation may cause the meltdown of the reactor, leading to the leakage of radioactive materials and damaging the surrounding environment.

Although the superiority of fusion energy has been recognized worldwide, the problems of high construction and maintenance costs and short steady-state operation time still greatly limit the popularization and application of the magnetic confinement fusion systems. Currently, considerable attention has been paid to the development of compact magnetic confinement fusion devices to reduce construction and maintenance costs and extend the steady-state operation time. Therefore, developing compact fusion devices with long-term steady-state operation is necessary for the development of magnetic confinement fusion energy.

Chinese Patent Application No. 99113505.9 discloses a spherical magnetic confinement nuclear fusion reactor main body. The special spherical magnetic field has the advantages of strong magnetic confinement, strong adiabatic compression heating performance, and concentrated energy reflection. It can achieve the deuterium-tritium reaction solely by Ohmic heating, or by enhancing the magnetic field intensity and auxiliary heating. Moreover, it also has the advantages of low construction cost, reliable operation, and easy maintenance and repair, and it is a practical controlled fusion device with a commercial potential for power generation, and heat and power supply.

Chinese Patent Application No. 200780007065.7 proposes a device and method for generating X-rays and/or ion beams and for generating and converting fusion energy into electrical energy. The device includes an anode and a cathode coaxially and at least partially positioned within a reaction chamber. An angular momentum is applied to the plasmoid through the cathode with a helical configuration, a helical coil surrounding the cathode or a combination thereof. The anode has an anode radius, and the cathode has a cathode radius. A high magnetic field is applied by the anode and the cathode. The reaction chamber includes gas and an electron discharge source electrically connected to the anode and cathode. As a result of the electron discharge, a dense magnetically-confined plasmoid is formed around the anode, and one or more particles are emitted.

Chinese Patent Application No. 201580030642.9 discloses a highly-efficient compact nuclear fusion reactor used as a neutron source or energy source. The reactor includes a toroidal plasma chamber and a plasma confinement system. The plasma confinement system is configured to generate a magnetic field for confining the plasma in the plasma chamber, and make the main radius of the confined plasma be 1.5 m or less. The toroidal magnetic field operates at 5 T or less, and the plasma current is 5 MA or less. Additionally, the generated α particles are confined in the plasma.

Chinese Patent Application No. 201610083015.8 discloses a method and system for generating the thermal nuclear fusion. In the method, a cavity containing a thermonuclear material in its inner layer is pre-set, and is provided with at least one laser injection hole to allow the laser to be injected into the cavity to ablate the thermonuclear material to generate a coronal plasma expanding towards the center of the cavity; the coronal plasma converges at the center of the cavity, and the kinetic energy of the plasma is converted into the internal energy of the plasma, forming the high-temperature and high-density convergent plasma; and the convergent plasma undergoes nuclear fusion reactions to release energy. The provided technical solutions can increase the temperature of the ignition hot spot and achieve the stable and high fusion output.

Chinese Patent Application No. 202010292584.X discloses a device and method for maintaining high-performance plasma. The device includes a central column, a vacuum container, and a plasma magnetic confinement system. The vacuum container surrounds the central column, and is used to accommodate the generated plasma. The plasma magnetic confinement system is configured to confine, shape, and control the plasma inside the vacuum container through the magnetic field to form the configuration of multiple fluids. Multiple fluids form multiple layers from the inside out, with the outer fluid layer surrounding the inner fluid layer in the, and adjacent fluids at least partially overlap. The thermal electron fluid and the thermal ion fluid are surrounded with a high-energy electron fluid by forming a configuration with multiple fluids, and the maintenance of the high-energy electron fluid ensures that there is a significant toroidal current outside the outer closed magnetic surface, to effectively avoid the plasma turbulence and energy diffusion, thereby reducing the particle recycling phenomena on the outer closed magnetic surface and effectively improving the energy confinement capability and stability for thermal ions and thermal electrons inside the closed magnetic surface.

However, the above-discussed patent literatures do not involve the superconducting magnet technology and radiation protection for personnel and the environment. Moreover, the magnetic field intensity, plasma parameters, and operation time of the host still need to be improved. Therefore, there is an urgent need for a novel magnetic confinement fusion reactor to address these issues.

SUMMARY

The purpose of this application is to provide a magnetic confinement fusion reactor to enhance the magnetic field strength, plasma parameters, and operating time of the current magnetic confinement fusion device.

The purpose of this application is achieved through the following technical solutions.

A magnetic confinement fusion reactor, comprising:
a Dewar system;
a cold shield system;
a superconducting magnet system;
a vacuum chamber system;
a divertor system;
a blanket system;
a remote operation system; and
a maintenance system;
wherein the Dewar system, the cold shield system, the superconducting magnet system, the vacuum chamber system, the divertor system, the blanket system, the remote operation system, and the maintenance system are provided in a host hall of the magnetic confinement fusion reactor, and together constitute a host of the magnetic confinement fusion reactor;
the superconducting magnet system comprises a central solenoid magnet, a poloidal field magnet, and a toroidal field magnet;
the central solenoid magnet is configured to provide necessary volt-seconds to generate, establish, and maintain a plasma current by current variations;
the poloidal field magnet is configured to generate a poloidal magnetic field to control a cross-sectional shape and position equilibrium of a plasma;
the toroidal field magnet is configured to generate a toroidal magnetic field to ensure macroscopic stability of the plasma;
the toroidal magnetic field and a poloidal magnetic field generated by the plasma current are configured to confine the plasma;
the Dewar system and the cold shield system are configured to provide a vacuum and cryogenic environment for the superconducting magnet system;
the vacuum chamber system is configured to create a clean and vacuum environment for stable operation of the plasma, and reduce nuclear heating deposition on the superconducting magnet system and environmental contamination induced by fusion neutrons;
the divertor system is configured to block impurities from a vessel wall, reducing contamination to the plasma in a central area, and discharge particle and heat flow from the plasma in the central area as well as helium ash generated during a fusion reaction;
the divertor system and the blanket system are provided inside the vacuum chamber system;
an energy carried by the fusion neutrons is configured to be deposited in the blanket system, carried by a coolant to an exterior of the magnetic confinement fusion reactor; and
the fusion neutrons are configured to undergo a nuclear reaction with a tritium breeder to produce tritium for fusion fuel supplement.
In some embodiments, the Dewar system comprises:
a top cover assembly;
a ring body assembly;
a base assembly;
a bellow tube assembly;
a support assembly; and
a venting assembly;
wherein the top cover assembly is fixedly connected with the ring body assembly through a vacuum sealed structure;
the ring body assembly is weldedly connected to the base assembly;
the bellow tube assembly is weldedly connected to the ring body assembly;
the base assembly is provided on the support assembly; and
an outer edge of the base assembly is fixedly connected to an external building.

In some embodiments, the top cover assembly is an elliptical head structure;
a circumferential reinforcement rib and a radial reinforcement rib are provided on an inner side of the top cover assembly; and
a top of the top cover assembly is provided with a plurality of installation channels and a plurality of maintenance channels.

In some embodiments, the ring body assembly has a straight-cylinder structure;
a circumferential reinforcement rib and a radial reinforcement rib are provided on an outer side of the ring body assembly; and
the ring body assembly is provided with a plurality of first connection channels along a height direction and a plurality of second connection channels along a circumferential direction.

In some embodiments, the base assembly is a straight-cylinder structure with a skirt edge portion;
an inner side of the skirt edge portion is circumferentially provided with a structure in support connection with the superconducting magnet system and the vacuum chamber system; and
the straight-cylinder structure is provided with a plurality of first connection channels along a height direction and a plurality of second connection channels along a circumferential direction.

In some embodiments, the venting assembly comprises:
a relief valve;
a bursting component; and
a venting pipeline;
wherein the relief valve, the bursting component, and the venting pipeline are configured to achieve pressure relief in response to the occurrence of helium leakage in the Dewar system.

In some embodiments, the cold shield system is configured to be divided into a plurality of cold shield sectors along a circumferential direction; and
adjacent cold shield sectors among the plurality of cold shield sectors are connected through a first insulation gasket.

In some embodiments, each of the plurality of cold shield sectors comprises a plurality of cooling panels; and adjacent cooling panels among the plurality of cooling panels are connected through a second insulation gasket.

In some embodiments, each of the plurality of cooling panels is welded with a serpentine cooling pipe.

In some embodiments, the cold shield system has a polished and silver-plated surface.

In some embodiments, the toroidal field magnet comprises:
a superconducting coil;

a coil box;
a terminal box;
a circumferential support; and
a gravity support;
wherein the toroidal field magnet consists of 16 sector-shaped superconducting magnets to generate the toroidal magnetic field to confine the plasma.

In some embodiments, the superconducting coil consists of a plurality of D-shaped coil windings;
each of the plurality of D-shaped coil windings comprises:
a low-field winding; and
a high-field winding;
wherein the low-field winding consists of two six-pancake sub-windings formed by winding of an Nb3Sn conductor;
the high-field winding consists of one twelve-pancake coil sub-winding formed by winding of the Nb3Sn conductor; and
the low-field winding and the high-field winding are connected in series through a superconducting joint.

In some embodiments, the coil box is D-shaped;
the coil box comprises:
an inner U-shaped box component;
an inner sealing cover plate;
an outer U-shaped box component; and
an outer sealing cover plate;
wherein a straight section of each of the inner U-shaped box component and the inner sealing cover plate is made of N50 stainless steel; and
an arc section of each of the inner U-shaped box component, the inner sealing cover plate, the outer U-shaped box component, and the outer sealing cover plate is made of 316LN stainless steel.

In some embodiments, a cooling pipe is provided inside the coil box.

In some embodiments, the terminal box comprises:
a support frame;
a superconducting joint; and
a liquid helium pipeline;
wherein the liquid helium piping comprises:
a cryogenic pipe; and
a helium branch;
wherein the cryogenic pipe is connected to a cryogenic system;
the helium branch is connected between windings of the superconducting coil; and
the liquid helium pipe is provided with an insulator.

In some embodiments, the circumferential support comprises:
a shear support plate;
an anti-shear square key;
a bolt;
an upper wing component; and
a lower wing component;
wherein the shear support plate, the anti-shear square key, the bolt, the upper wing component, and the lower wing component are configured to connect the 16 sector-shaped superconducting magnets in a circumferential direction, and restrain a slippage disturbance between the 16 sector-shaped superconducting magnets.

In some embodiments, the gravity support is provided at a bottom of the toroidal field magnet to bear the toroidal field magnet;
the gravity support comprises:
a support leg for supporting the toroidal field magnet;
an insulation pad;
a thermal barrier component; and
a flexible support;
wherein a plurality of cooling pipes are provided inside the thermal barrier component; and
the flexible support consists of a plurality of flexible support plates.

In some embodiments, the central solenoid magnet is formed by stacking a plurality of solenoid coil;
a plurality of solenoid coils are configured to provide the required magnetic flux for the breakdown of the plasma in the fusion reactor; and
the central solenoid magnet works in conjunction with the poloidal field magnet to heat and shape the plasma.

In some embodiments, the central solenoid magnet is an annular superconducting coil wound with Cable-in-Conduit Conductors (CICC); and
one part of the central solenoid magnet is made of a high-temperature superconductor, and the other part of the central solenoid magnet is made of an Nb3Sn superconductor.

In some embodiments, the central solenoid magnet comprises:
a coil winding;
a joint assembly;
a cooling structure; and
a pre-compression system;
wherein the coil winding comprises a plurality of high-temperature superconducting modules and a plurality of Nb3Sn superconducting modules; and
each of the plurality of high-temperature superconducting modules and the plurality of Nb3 Sn superconducting modules is made by tension-free winding.

In some embodiments, there is transition insulation between conductors, inter-disk insulation between disk-type windings, and ground insulation outside.

In some embodiments, a terminal of each of the plurality of high-temperature superconducting modules is led out from an inner side of the central solenoid magnet;
a terminal of each of the plurality of Nb3Sn superconducting modules is led out from an outer side of the central solenoid magnet; and
the terminal of each of the plurality of high-temperature superconducting modules and the terminal of each of the plurality of Nb3Sn superconducting modules are connected to a feeder system respectively from upper and lower ends of the central solenoid magnet.

In some embodiments, the joint assembly comprises:
a first joint; and
a second joint;
wherein the first joint is a box-type joint, and is connected to a feeder line;
the second joint is coaxially provided inside the coil winding; and
the cooling structure is configured to cool the central solenoid magnet with liquid helium.

In some embodiments, the pre-compression system comprises:
an axial pre-compression mechanism;
an upper centering mechanism;
a lower gravity support mechanism; and
a cooling pipeline;
wherein the axial pre-compression mechanism is configured to compact the plurality of high-temperature superconducting modules and the plurality of Nb3Sn superconducting modules;
the upper centering mechanism is configured to center the central solenoid magnet;

the lower gravity support mechanism is configured to support the central solenoid magnet; and the cooling pipeline is configured to cool the pre-compression system.

In some embodiments of the present disclosure, the poloidal field magnet comprises:

a plurality of annular coils surrounding the toroidal field magnet;

the plurality of annular coils are configured to provide the poloidal magnetic field for controlling configuration of the plasma; and the central solenoid magnet and the poloidal field magnet are configured to work together to heat and shape the plasma.

In some embodiments of the present disclosure, wherein the poloidal field magnet is an annular superconducting coil wound with a Cable-in-Conduit Conductor (CICC); and one part of the poloidal field magnet is made of a NbTi superconductor, and the other part of the poloidal field magnet is made of a Nb3Sn superconductor.

In some embodiments, the poloidal field magnet comprises:

a coil winding;
a helium pipe;
a joint;
a tail structure; and
a terminal box;

wherein the coil winding is formed by series connection of a plurality of double-disk, four-disk, or six-disk coils through the joint; and each unit of the coil winding is wound with a single conductor wire using a tension-free winding method.

In some embodiments, there is transition insulation between conductors, inter-disk insulation between disk-type windings, and ground insulation on an outer side of the magnetic confinement fusion reactor.

In some embodiments, the helium pipe is provided at an inter-disk transition region to introduce liquid helium into conductors for cooling superconducting wires.

In some embodiments, two lead-out ends of the coil winding are each provided with the tail structure to enhance strength of the two lead-out ends to withstand a circumferential stress of the coil winding.

In some embodiments, lead-out ends of the coil winding, the helium pipe and measurement lines are configured to converge in the terminal box, and be connected to a feeder line and led to an exterior of the magnetic confinement fusion reactor.

In some embodiments, the magnetic confinement fusion reactor further comprises:

a transmission feeder system;

wherein the transmission feeder system is provided with an independent power supply circuit for individual or individual groups of superconducting magnets in the magnetic confinement fusion reactor;

the transmission feeder system comprises a signal collection channel; and the transmission feeder system is led from an outside of the magnetic confinement fusion reactor and connected to the superconducting magnet system.

In some embodiments, the transmission feeder system comprises:

a magnet feeder terminal box;
a pressure relief valve assembly;
a transition feeder; and
an inner feeder.

In some embodiments, the magnet feeder terminal box comprises:

an outer Dewar;
a cold shield;
a superconducting current lead;
a superconducting joint;
a superconducting cable;
a cryogenic transfer pipe; and
a cryogenic valve component.

In some embodiments, the pressure relief valve assembly comprises:

a heat exchanger;
a control valve-safety valve component;
a flowmeter;
a differential pressure gauge-pressure gauge component; and
a valve rack.

In some embodiments, the transition feeder comprises:

an outer cylindrical shell;
a cold shield;
a superconducting joint;
a superconducting cable;
a vacuum barrier;
a support; and
a seismic bellow tube.

In some embodiments, the inner feeder comprises:

a superconducting cable;
a superconducting joint; and
a support.

In some embodiments, the outer Dewar is a two-segment cylindrical shell made of stainless steel;

the cold shield is provided inside the two-segment cylindrical shell;

a cooling pipe and multiple layers of heat insulation are provided on the cold shield;

the two-segment cylindrical shell is provided with an aviation plug interface for connection with pressure, temperature, voltage, and vacuum sensors in the transition feeder and the inner feeder;

the two-segment cylindrical shell is further provided with a flange hole in which the superconducting current lead is provided vertically;

the superconducting current lead is connected to the superconducting joint on a superconducting cable with a shape of "S" or "U" through a current lead joint box; and the cryogenic valve component is provided on the two-segment cylindrical shell through a flange to control a 80K coolant loop of the cold shield, a 50K coolant input and a 300K coolant output of the superconducting current lead, and a 4.5K coolant output of the superconducting cable and the superconducting current lead.

In some embodiments, the superconducting current lead comprise:

a room temperature segment;
a heat-exchange segment;
a high-temperature superconducting segment; and
a cryogenic superconducting segment;

wherein the room temperature segment comprises a water-cooling row and an insulated flange;

the water-cooling row is connected to a power supply system;

the insulated flange is connected to the magnet feeder terminal box;

the heat-exchange segment has a fin structure made of oxygen-free copper;

a working temperature of the high-temperature superconducting segment is 5K-65K;

the high-temperature superconducting segment is configured to be cooled by conduction; and a first end of a cryogenic superconducting cable in the cryogenic superconducting segment is welded to the high-temperature superconducting segment, and a second end of the cryogenic superconducting cable is connected to a joint box.

In some embodiments, the heat exchanger is configured to make a temperature of a coolant gas at a 300K outlet of the superconducting current lead to ambient temperature to achieve valve protection;

the control valve-safety valve component is configured to release excessive pipe pressure in the case of an accident to ensure safe operation of the transmission feeder system;

the flowmeter is configured to collect and calculate a real-time flow rate;

the pressure differential gauge-pressure gauge component is configured to monitor pipeline operation; and the valve rack is a frame structure to support the heat exchanger, the control valve-safety valve component, the flowmeter, the differential pressure gauge-pressure gauge component.

In some embodiments, the transition feeder is provided with an S-shaped cryogenic superconducting cable to absorb mechanical stress applied to the superconducting cable during magnet coil cooling and operation.

In some embodiments, the vacuum chamber system comprises:

a vacuum chamber main body;
an upper window;
a middle window;
a lower window;
a gravity support; and
a neutron shielding block.

In some embodiments, the vacuum chamber system is provided inside the superconducting magnet system, and is configured to provide support for internal components and window plugins;

the vacuum chamber system has a vacuum cavity structure which is configured to offer a vacuum environment for plasma operation, and also provide a first-layer confinement barrier against tritium and activated dust.

In some embodiments, the vacuum chamber main body is a double-layered shell structure with a D-shaped cross-section; and a space between double layers of the double-layered shell structure is filled with borated water and the neutron shielding block to play a shielding role.

In some embodiments, the upper window, the middle window, and the lower window are configured to provide a channel accessing the plasma for diagnosis, heating, pumping, and internal component management.

In some embodiments, the gravity support is a flexible plate structure to absorb a thermal expansion and contraction displacement of the vacuum chamber main body.

In some embodiments of the present disclosure, the divertor system is provided inside the vacuum chamber system; and the divertor system comprises a plurality of divertor modules and a divertor piping.

In some embodiments, each of the plurality of divertor modules comprises:

a cassette body;
an outer target plate;
a dome; and
an inner target plate;

wherein the cassette body is configured to serve as a main load-bearing component to integrate the inner target plate, the dome, and the outer target plate into a whole;

the outer target plate consists of a first plasma-facing unit and a first transition support;

the dome consists of a second plasma-facing unit and a second transition support; and the inner target plate consists of a third plasma-facing unit and a third transition support.

In some embodiments, the first plasma-facing unit, the second plasma-facing unit, and the third plasma-facing unit each adopt a flat plate structure;

the first plasma-facing unit is provided with a first internal flow channel; the second plasma-facing unit is provided with a second internal flow channel; the third plasma-facing unit is provided with a third internal flow channel; a part of the first internal flow channel within a thermal load area of the first plasma-facing unit and a part of the third internal flow channel within a thermal load area of the third plasma-facing unit each adopt a hypervapotron structure with longitudinal and transverse grooves; and a remaining part of the first internal flow channel, a remaining part of the third internal flow channel and the second internal flow channel each adopts a bare pipe structure.

In some embodiments, each of the plurality of divertor modules comprises an inner support, a middle support, and an outer support that are connected by a transition block;

upper and lower surfaces of the transition block are machinable to compensate for an assembly error of each of the plurality of divertor modules; and a lower structure of each of the inner support, the middle support, and the outer support is fixedly connected to the vacuum chamber system.

In some embodiments, the divertor piping consists of inlet and outlet cooling pipes of the plurality of divertor modules and pipe clamps thereof.

In some embodiments, the blanket system is provided inside the vacuum chamber system, and is configured to directly face the plasma.

In some embodiments, the blanket system comprises:

a top blanket;
a high-field side blanket;
a low-field side blanket; and
a blanket piping;

wherein each of the top blanket, the high-field side blanket and the low-field side blanket consists of a first wall and a shielding block.

In some embodiments, the remote operation system comprises:

an internal component operation sub-system;
a window plugin operation sub-system; and
a transfer sub-system.

In some embodiments, the internal component operation sub-system comprises: an operation arm transfer cask;
an operation arm main body;
a transport arm transfer cask;
a transport arm main body; and
a tool deployment box;

wherein the operation arm main body and the transport arm main body are provided in a middle window of a vacuum chamber with an angle of 90 degrees relative to each other;

the operation arm main body is docked with an actuator inside the tool deployment box through a quick coupling, and is configured to hold and operate a tool inside the tool deployment box or transport a component in the vacuum chamber through the actuator; and the transport arm transfer cask is configured to provide storage space for the actuator, tool, and internal component required by the operation arm main body for maintenance of the component in the vacuum chamber.

In some embodiments, the window plugin operation sub-system comprises:
a multi-degree-of-freedom robotic arm;
an actuator tool; and
a window plugin transfer mechanism.

In some embodiments, the transfer sub-system comprises:
a transfer main body;
a docking mechanism; and
a transport unit;
wherein an inside of the transfer main body is provided with a double-layered movable platform structure comprising a lower-layer movable platform and an upper-layer movable platform;
the lower-layer movable platform is configured to transport the upper-layer movable platform to be docked to a rail of a vacuum chamber;
the upper-layer movable platform is configured to integrate the window plugin operation sub-system to a window of the vacuum chamber along the rail, remove a vacuum chamber sealing mechanism, replace a window plugin maintenance actuator to remove a window plugin, and drag the window plugin along the rail into the transfer main body; and
after a double-sealed door in the transfer main body is closed, the transfer main body is configured, in response to a case that the window plugin reaches the transfer main body, to close a double-sealed door, be disengaged from the docking mechanism, and be transported by the transport unit to a hot cell docking area.

In some embodiments, the magnetic confinement fusion reactor further comprises:
a host assembly system;
wherein the host assembly system comprises:
an assembly strategy;
a special pre-assembly tool;
a special assembly tool;
an assembly reference grid and alignment measurement system;
a welding and non-destructive testing system;
a vacuum leak detection system; and
an insulation and voltage testing system.

In some embodiments, the assembly strategy is configured to define a sequence and an implementation plan for assembling components of the host of the magnetic confinement fusion reactor.

In some embodiments, the special pre-assembly tool is configured for assembling, splicing, and testing components of the host of the magnetic confinement fusion reactor in a pre-assembly hall;
the special pre-assembly tool comprises:
a ⅛ vacuum chamber assembly platform;
a central solenoid magnet assembly platform;
a Dewar base assembly welding platform;
a temporary support tool for component testing;
a toroidal field magnet rotating tooling; and
a vacuum chamber rotating tooling.

In some embodiments, the special assembly tool is configured for lifting, positioning, welding, and testing components of the host of the magnetic confinement fusion reactor in the host hall;
the special assembly tool comprises:
a Dewar base lifting tool;
a poloidal field magnet lifting tool;
a temporary support and lifting platform for supporting and lifting the central solenoid magnet, the toroidal field magnet and poloidal field magnet;
a temporary support and lifting tool for a vacuum chamber;
a toroidal field magnet rotation tooling;
a blanket transport and lifting tooling;
a ⅛ sector lifting and positioning tooling; and
a temporary support for upper window, middle window, and lower window.

In some embodiments, the assembly reference grid and alignment measurement system is configured to provide assembly reference and alignment measurement for assembly and positioning of components of the host of the magnetic confinement fusion reactor.

In some embodiments, the welding and non-destructive testing system is configured to provide welding and defect detection for assembly welds of components of the host of the magnetic confinement fusion reactor.

In some embodiments, the vacuum leak detection system is configured to provide vacuum leak detection for assembly of components of the host of the magnetic confinement fusion reactor.

In some embodiments, the insulation and voltage testing system is configured to provide insulated assembly and voltage testing for magnets and feeder components of the host of the magnetic confinement fusion reactor.

In some embodiments, the host hall is divided into five floors consisting of L1, L2, L3, B1, and B2;
the host of the magnetic confinement fusion reactor penetrates through the five floors; and
a concrete biological shielding layer with a thickness of two meters is provided for protecting the host of the magnetic confinement fusion reactor.

The magnetic confinement fusion reactor of the present disclosure provides a method for designing a fusion reactor poloidal field magnet system based on CICC. By multi-wind series design, the turns of the coil are increased, while the cooling circuit of the coil can be shortened, effectively improving the safety, stability, and cost-effectiveness of the fusion reactor magnet system. With independent process and assembly, the feeder lines provided by the present disclosure do not interfere with each other, and their installation positions can be arranged at the most suitable positions for connection with the corresponding magnets, reducing assembly difficulty and saving internal connection space of the device. They can also be distributed on different levels of the building according to the layout of the building, which is conducive to daily maintenance. The vacuum chamber system in the present disclosure is a large and sophisticated double-layered nuclear pressure vessel with resistance to radiation, long lifespan, high vacuum, and multiple dynamic loads. The internal design uses small-angle poloidal double-layered cooling channels, which can achieve efficient automatic heat dissipation and vacuum baking. The neutron shielding blocks can minimize the damage of high-energy fusion neutrons to superconducting magnets and reduce the ripple of the toroidal magnetic field.

Figure 1:
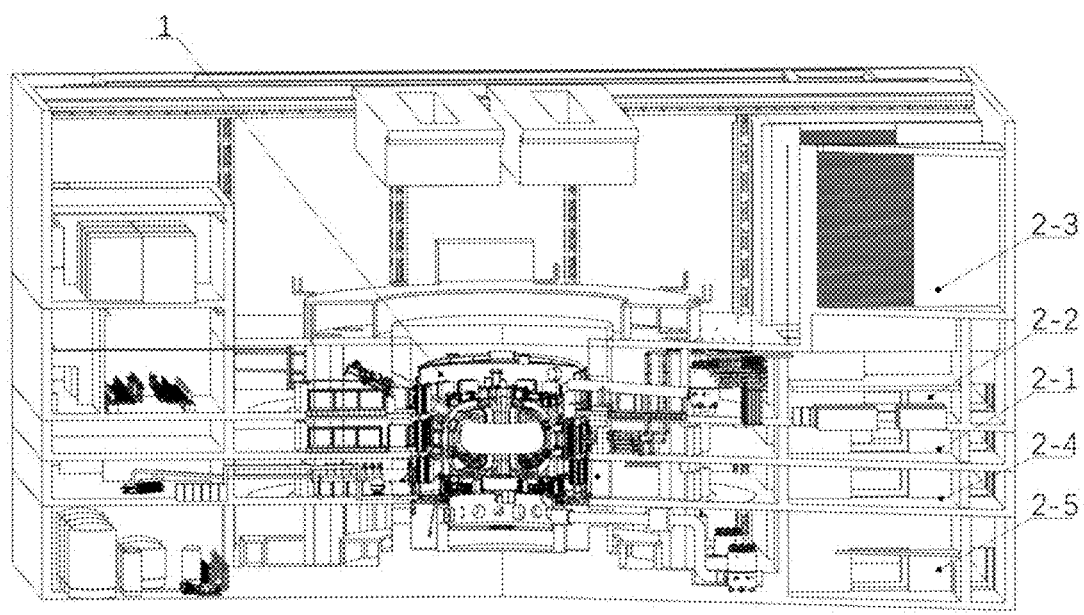
FIG. 1 is a schematic diagram of the layout of a fusion reactor host in a host hall according to an embodiment of the present disclosure.
Figure 2:
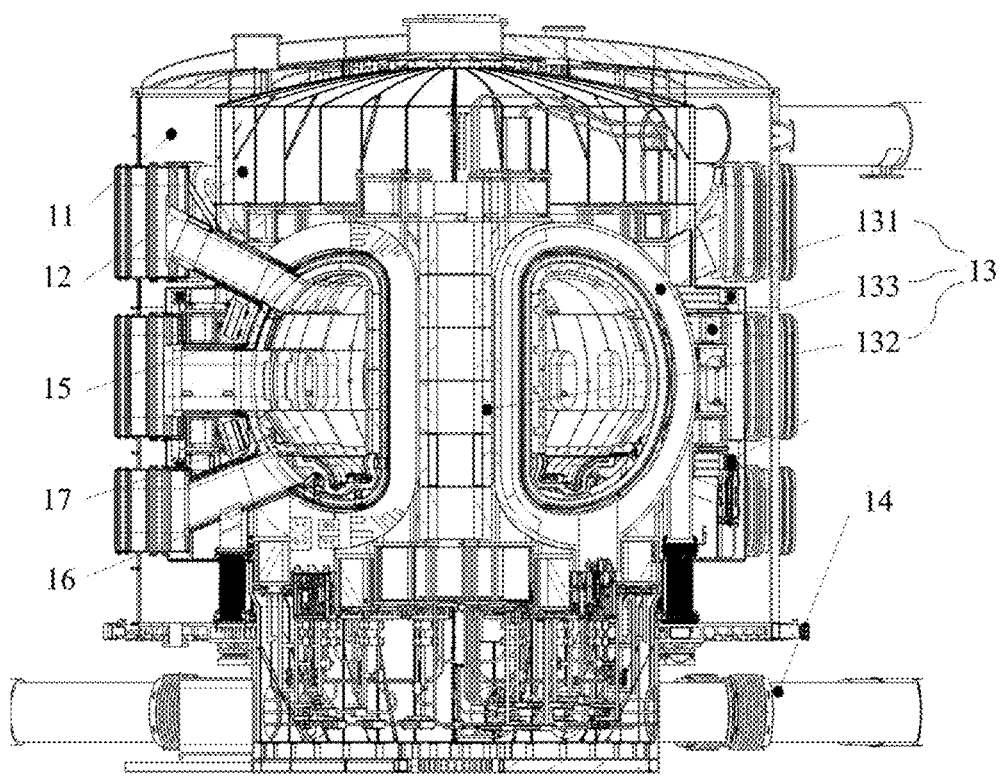
FIG. 2 is an enlarged view of the fusion reactor host according to an embodiment of the present disclosure.

In the figures: 1—fusion reactor host; 2—host hall; 2-1—L1 layer; 2-2—L2 layer; 2-3—L3 layer; 2-4—B1 layer; 2-5—B2 layer; 11—Dewar system, 12—cold shield system; 13—superconducting magnet system; 14—transmission feeder system; 15—vacuum chamber system; 16—divertor system; 17—blanket system; 18—remote operation system; 111—Dewar top cover; 1111—top cover maintenance window; 1112—top cover body; 112—Dewar ring body; 1121—upper ring body; 1122—lower ring body; 113—Dewar base; 1131—support component; 1132—base body; 1211—upper Dewar cold shield; 12111—upper Dewar cold shield support; 12112—upper Dewar cold shield panel; 12113—upper Dewar cold shield labyrinth structure; 1212—middle Dewar cold shield; 1213—lower Dewar cold shield; 12131—lower Dewar cold shield labyrinth structure; 12132—lower Dewar cold shield panel; 12133—lower Dewar cold shield diagonal rod; 12134—lower Dewar cold shield support; 1214—vacuum chamber cold shield; 12141—vacuum chamber cold shield C-shaped panel; 12142—vacuum chamber cold shield I-shaped panel; 1215—window cold shield; 12151—upper window cold shield; 12152—middle window cold shield; 12153—lower window cold shield; 131—toroidal field magnet; 132—poloidal field magnet; 133—central solenoid magnet; 1311—superconducting coil; 13111—low—field winding; 13112—high-field winding; 1312—toroidal field coil box; 13121—inner U-shaped box component; 13122—inner sealing cover plate; 13123—outer U-shaped box component; 13124—outer sealing cover plate; 1313—toroidal field terminal box; 13131—support frame; 13132—first superconducting joint; 13133—liquid helium inlet/outlet pipe; 1314—toroidal field circumferential support; 13141—upper wing component; 13142—lower wing component; 13143—bottom circumferential support; 1315—toroidal field gravity support; 13151—toroidal field magnet support leg; 13152—thermal barrier component; 13153—flexible support; 1321—first poloidal field magnet; 1322—second poloidal field magnet; 1323—third poloidal field magnet; 1324—fourth poloidal field magnet; 1325—fifth poloidal field magnet; 1326—sixth poloidal field magnet; 1327—seventh poloidal field magnet; 141—magnet feeder terminal box; 1411—terminal box outer Dewar; 1412—terminal box cold shield; 142—high-temperature superconducting current lead; 1421—room temperature segment; 1424—cryogenic superconducting segment; 143—pressure relief valve assembly; 1431—heat exchanger; 1432—control valve-safety valve component; 1433—flowmeter; 1434—differential pressure gauge-pressure gauge component; 1435—valve rack; 144—transition feeder; 1441—outer cylindrical shell; 1442—first cold shield; 1443—first superconducting joint; 1444—first superconducting cable; 1445—vacuum barrier; 1446—first support; 1447—seismic bellow tube; 145—inner feeder; 1451—second superconducting cable; 1452—second superconducting joint; 1453—second support; 151—vacuum chamber main body; 152—upper window; 153—middle window; 154—lower window; 155—vacuum chamber gravity support; 156—neutron shielding block; 161—divertor cassette body; 162—outer target plate; 1621—first plasma-facing unit; 1622—first transition support; 163—dome; 1631—second plasma—facing unit; 1632—second transition support; 164—inner target plate; 1641—third plasma—facing unit; 1642—third transition support; 1711—high-field side blanket; 1712—top blanket; 1713—low-field side blanket; 1811—operation arm mounting base plate; 1812—operation arm; 1813—transport arm mounting base plate; 1814, transport arm; 1815—tool deployment box.

DETAILED DESCRIPTION OF EMBODIMENTS

The present disclosure will be described in further detail below with reference to the accompanying drawings and embodiments. The following embodiments are merely used to illustrate the present disclosure, and are not intended to limit the scope of the present disclosure.

In the description of the present disclosure, it is to be understood that the orientation or positional relationships indicated by terms "upper", "low", "top", "bottom", "inside", and "outside", etc. are based on those shown in the accompanying drawings. These terms are only for the purpose of facilitating and simplifying the description of the present disclosure, instead of indicating or implying that the device or element referred to must have a particular orientation, be constructed and operated in a particular orientation. Therefore, these terms are not to be construed as limitations of the present disclosure. Furthermore, the terms "first", "second", etc. are used for descriptive purposes only, and are not to be understood as indicating or implying the relative importance.

In the present disclosure, unless otherwise expressly specified and limited, the terms "install", "attach", "connect", "fix" and the like shall be interpreted in a broad sense. For example, it can be fixed connection, removable connection, or integral connection; mechanical connection or electrical connection; direct connection or indirect connection through an intermediate medium; or internal communication or interaction between two elements. For those skilled in the art, the specific meanings of the above terms in the present disclosure may be understood on a box-by-case basis.

A magnetic confinement fusion reactor includes a fusion reactor host 1 and a host hall 2. The fusion reactor host 1 includes a Dewar system 11, a cold shield system 12, a superconducting magnet system 13; a transmission feeder system 14, a vacuum chamber system 15, a divertor system 16, a blanket system 17, and a remote operation system 18. As the core part of the present disclosure, the fusion reactor host 1 is configured to generate and maintain the fusion reactor and provided in the host hall 2 which provides structural support for the fusion reactor host 1 and serves as a shielding containment structure for nuclear radiation and leakage, ensuring the safety of the external environment and personnel outside the host hall 2. The host hall is divided into five floors, namely L1, L2, L3, B1, and B2. The fusion reactor host penetrates through all the five floors, with a two-meter-thick concrete biological shielding layer provided for protection.

The layout of a fusion reactor host/reactor device host in a host hall is shown in FIG. 1. The fusion reactor host 1 is provided in the host hall 2, which includes multiple floors. Each floor corresponds to a different height position of the fusion reactor host 1 and provides gravity support for the fusion reactor host 1 and various auxiliary systems installed on the fusion reactor host 1. Additionally, each floor serves as maintenance and operation access routes for the remote operation system 18.

Figure 3:
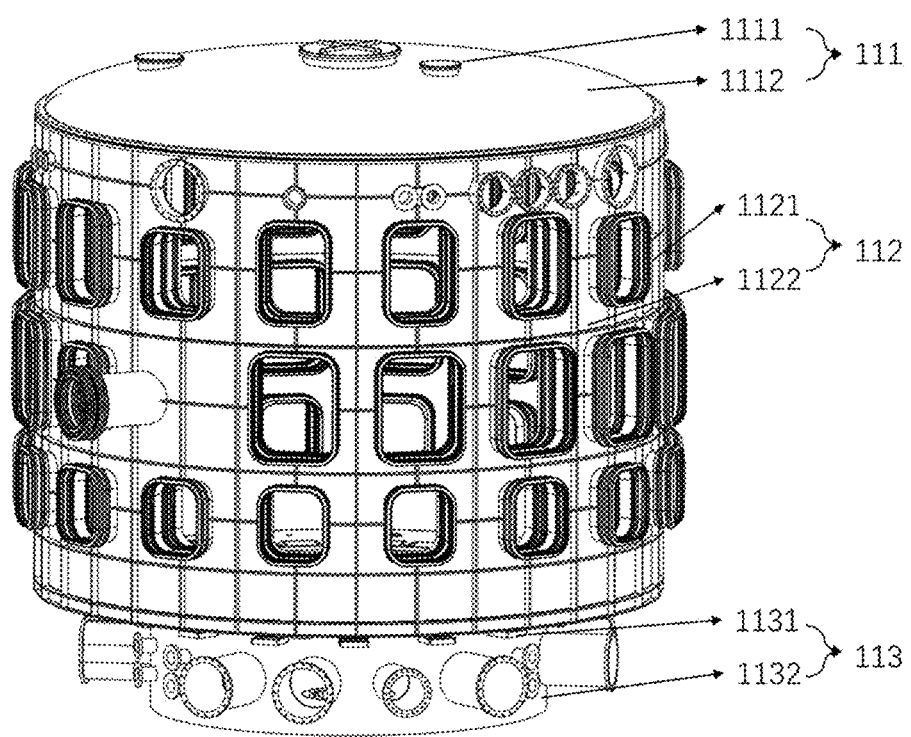
FIG. 3 is a schematic diagram of the structure of a Dewar system according to an embodiment of the present disclosure.

The structure of a Dewar system is shown in FIG. 3, and the assembly of the Dewar system involves the following process. Firstly, a certain number of support components 1131 are fixedly connected to the building support surface along the circumferential direction. At the same radial positions as the support components 1131, a certain number of restraint structures are fixed along the circumferential direction on the biological shielding wall. Then, the Dewar base 113 is provided on the support components 1131 and fixedly connected through bolts. The outermost edge of the skirt edge portion of the Dewar base 113 is fixedly connected to the restraint structure on the biological shielding wall through bolts. Further, the Dewar ring bodies 112 are provided on the Dewar base 113 and connected by welding to the outermost edge of the skirt edge portion of Dewar base 113, with vacuum leak testing performed on the welds. After the leak rate meets the design requirements, the lower half of the lip seal ring is welded to the upper plane of the ring body, and the upper half of the lip seal ring is welded to the lower plane of the top cover. A certain number of positioning supports are provided along the circumferential direction on the upper plane of the ring body. The outer sides of the lip seal rings are aligned vertically by the placement of the top cover. Additionally, welding is commenced after the welding requirements are met, and self-fusing welding and symmetrical welding are adopted to avoid significant deformation. During the welding process, welding is performed while the bolts are fixed until both welding and bolt fixation are completed. Further, inner channel bellow tubes are welded to the vacuum chamber tubes one by one on the position of upper, middle and lower openings of the Dewar ring body 112, until all inner channel bellow tubes are welded. After the inner channel bellow tubes pass the leak test and meet design requirements, outer channel bellow tubes are welded on the position of the upper, middle, and lower openings of the outer sides of the Dewar ring body 112. After all the outer channel bellow tubes are welded, each weld is tested for leak until the leak test to the outer channel bellow tubes meets the vacuum leak rate requirements. Finally, the venting assembly are connected and fixed connected to the Dewar ring body 112 to complete the integration assembly of all components.

A magnetic confinement fusion reactor/reactor cold shield is provided by the present disclosure. The cold shield system 12 is divided into 16 cold shield sectors (sectors 1-16) in the circumferential direction. There are three types of cold shield sectors in total: sectors (1, 3, 5, 9, 11, and 13) belong to the first type; sectors (2, 4, 6, 8, 10, 12, 14, and 16) belong to the second type; sectors (7 and 15) belong to the third type. The above three types of cold shield sectors are composed of 8 independent cooling panels 17-24. It is understood that before the combination of cold shield sectors, the cooling circuits of the 8 independent cooling panels need multiple iterations of design to meet the temperature and pressure drop requirements. In each iteration, the spacing between adjacent cooling tubes in the cooling circuit needs to be determined, which directly determines the temperature distribution in the area between the cooling tubes, and then the cooling circuits are evaluated and adjusted based on the total cooling circuit pressure drop calculation formula. Further, the independent cooling panels 17-24 are then combined to form the above three types of cold shield sectors. Specifically, the first type of cold shield sector is formed by panels 25-30 connected through G10 insulation gaskets. The panels 25-30 are formed by pairing and connecting the independent cooling panels (17 with 17, 18 with 18, 19 with 19, 21 with 21, 23 with 23, and 24 with 24) using G10 insulation gaskets.

The second type of cold shield sector is formed by panels 25, 26, 31, 28, 29, and 30 connected through G10 insulation gaskets. The panels 25, 26, 31, 28, 29, and 30 are formed by pairing and connecting the independent cooling panels (17 with 17, 18 with 18, 20 with 20, 21 with 21, 23 with 23, and 24 with 24) using G10 insulation gaskets.

The third type of cold shield sector is formed by panels 25, 26, 31, 32, 29, and 30 connected through G10 insulation gaskets. The panels 25, 26, 31, 32, 29, and 30 are formed by pairing and connecting the independent cooling panels (17 with 17, 18 with 18, 20 with 20, 22 with 22, 23 with 23, and 24 with 24) using G10 insulation gaskets. The assembly of the above three types of sectors are arranged according to a specific number and position and connected through G10 insulation gaskets to form the fusion device cold shield.

Figure 4:
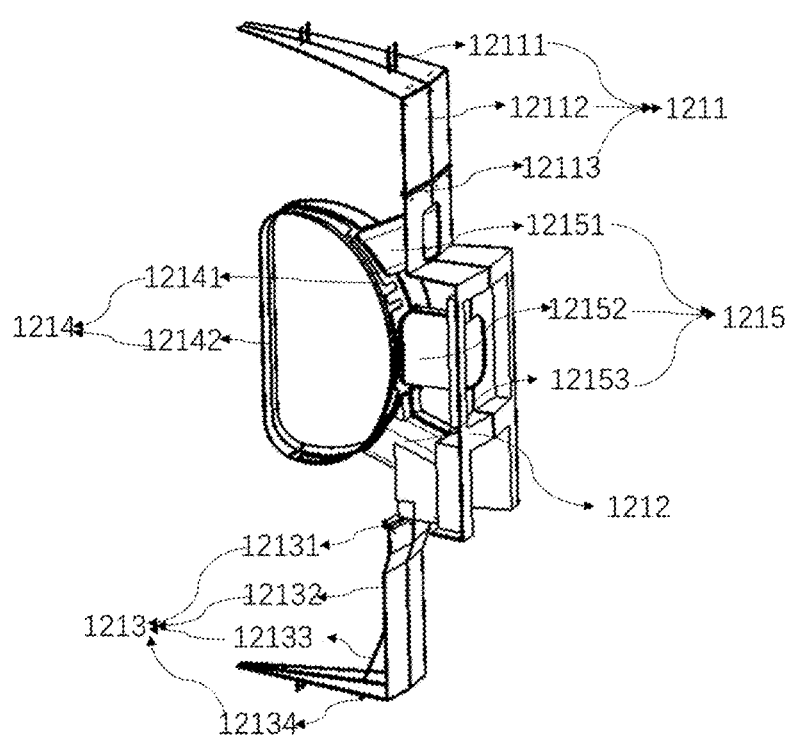
FIG. 4 is a schematic diagram of the structure of a cold shield system according to an embodiment of the present disclosure.
Figure 5:
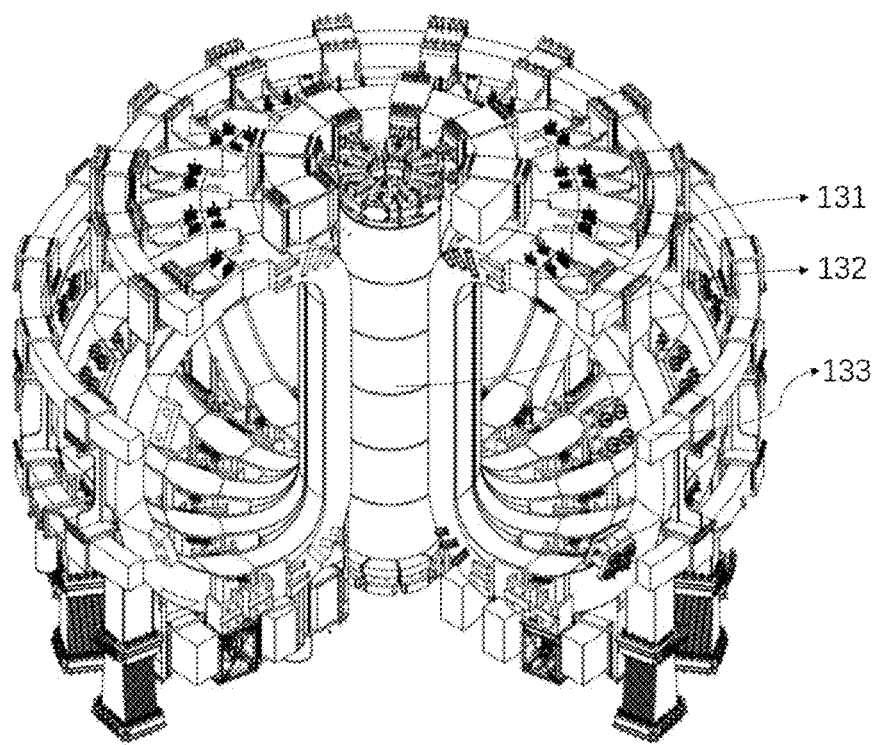
FIG. 5 is a schematic diagram of the structure of a superconducting magnet system according to an embodiment of the present disclosure.

The overall structure of the cold shield is uniformly divided into the cold shield sectors 1-16, with each cold shield sector accounting for 22.5°. Specifically, the structure of a cold shield sector is shown in FIG. 4. The cold shield sector includes an upper Dewar cold shield 1211, a middle Dewar cold shield 1212, a lower Dewar cold shield 1213, a vacuum chamber cold shield 1214, and a window cold shield 1215. The upper Dewar cold shield 1211 includes upper Dewar cold shield supports 12111, upper Dewar cold shield panels 12112, and upper Dewar cold shield labyrinth structure 12113. The lower Dewar cold shield 1213 includes lower Dewar cold shield labyrinth structure 12131, lower Dewar cold shield panels 12132, lower Dewar cold shield diagonal rod 12133, and lower Dewar cold shield supports 12134. The vacuum chamber cold shield 1214 includes vacuum chamber cold shield C-shaped panels 12141 and vacuum chamber cold shield I-shaped panels 12142. The window cold shield 1215 includes upper window cold shield 12151, middle window cold shield 12152, and lower window cold shield 12153. Moreover, the fusion device cold shield has a polished and silver-plated surface.

Figure 6:
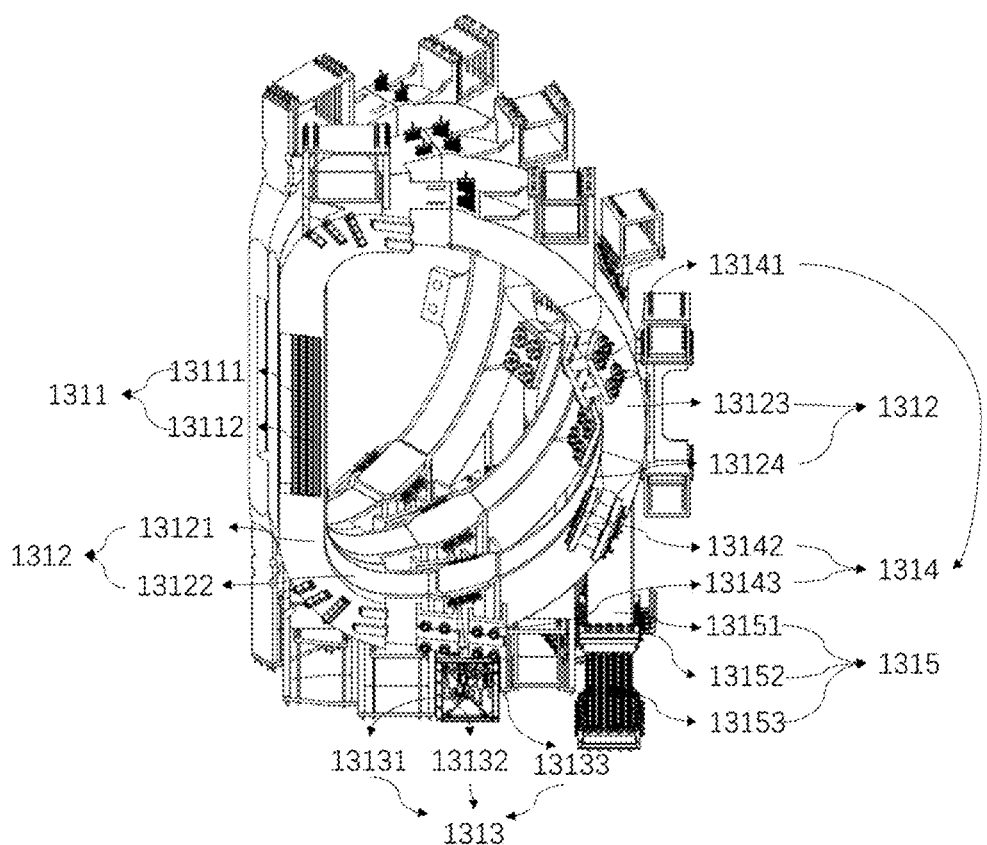
FIG. 6 is a schematic diagram of the structure of toroidal field magnets according to an embodiment of the present disclosure.

The toroidal field magnets 131, as shown in FIG. 6, provide a high magnetic field to effectively confine the plasma. To effectively confine the plasma, this present disclosure mainly describes the implementation of the toroidal field magnets 131. The toroidal field magnets 131 consist of superconducting coils 1311, toroidal field coil boxes 1312, toroidal field terminal boxes 1313, toroidal field circumferential supports 1314, and toroidal field gravity supports 1315.

Further, the superconducting coils 1311 are designed to maximize the current-carrying capacity of various superconducting materials, thereby reducing the manufacturing cost of the coils. Consequently, two types of conductors are employed for coil winding. Specifically, based on the maximum magnetic field the conductor can withstand, the superconducting coils are categorized into high-field winding 13112 and low-field winding 13111.

The low-field windings 13111 consist of two six-pancake sub-windings formed by winding of Nb3Sn conductors with ITER-grade, while the high-field winding 13112 consists one twelve-pancake sub-winding formed by winding of high-performance Nb3Sn conductors, which are connected in series through first superconducting joints. Then, the coils are cured together using epoxy resin by vacuum impregnation. The first superconducting joints are designed in a double-box overlapping form. Moreover, each joint box consists of a joint box main body, a joint box cover plate, and connecting reinforcement blocks. The joint box main body is manufactured by processing after explosion welding and bending of 316L stainless steel and bismuth-containing copper alloy. The joint box cover plate is made of 316L stainless steel with the surface temperature of the superconducting cable lower than 200 degrees during welding. The preparation steps for the superconducting cable at the overlap of the joint are described as follows: remove the outermost armor of the conductor, then remove the tape layer, and finally remove the Ni or Cr layer on the surface of the superconducting cable. After the preparation is completed, the superconducting cable is placed in the assembled joint box for sealing welding.

To cool the superconducting coils, liquid helium is led into conductors through liquid helium inlet/outlet pipes and helium pipe joints of the windings. The helium pipe joints are provided on the conductor armor of the innermost and outermost layers in the winding's helical region, where helium holes are machined. Subsequently, the conductor's insulating layer is removed to reduce the flow resistance of the liquid helium. The helium pipes are then welded at the positions of the helium holes. To prevent damage or burning of the superconducting cables in the conductors due to excessive temperature during welding, the surface temperature of the superconducting cables is required to be lower than 200 degrees during welding.

The toroidal field coil boxes 1312 are provided outside the superconducting coil 1311 and configured to protect and secure the superconducting coils while also providing support and fixation for other components in the tokamak device, such as the poloidal field (PF) coils. The toroidal field coil box 1312 is D-shaped in structure, consisting of an inner straight section and an arc section. It mainly includes inner U-shaped box components 13121, inner sealing cover plates 13122, outer U-shaped box components 13123, and outer sealing cover plates 13124. The inner straight sections of the inner U-shaped box components 13121 and inner sealing cover plates 13122 are made of N50 stainless steel, while the arc sections of the inner U-shaped box components 13121, inner sealing cover plates 13122, outer U-shaped box components 13123, and outer sealing cover plates 13124 are made of 316LN stainless steel. After the superconducting coils 1311 are mounted inside the toroidal field coil boxes 1312, the inner U-shaped box components 13121 and outer U-shaped box components 13123 are welded along the interface. Subsequently, the inner sealing cover plates 13122 and outer sealing cover plates 13124 are inserted and welded along the interface. To minimize heat leakage from the superconducting coil 1311 and cool the toroidal field coil boxes 1312, seamless stainless steel cooling pipes are provided inside the toroidal field coil boxes 1312. Liquid helium is led through these cooling pipes to cool the toroidal field coil boxes 1312.

The toroidal field terminal box 1313 includes support frames 13131, the first superconducting joints 13132, and the liquid helium inlet/outlet pipes 13133. The support frames 13131 can be manufactured by splicing welding 10 mm thick stainless steel plates and then processing contact surfaces, and finally being fixed with bolts. The first superconducting joints 13132 provide installation seats in the middle of the joint box, with the installation seats on the joints connected to support plates which are fixed connected to the toroidal field coil box 1312 through supports. The liquid helium inlet/outlet pipes 13133 are designed with two inlets and two outlets to meet the cooling requirements of the superconducting coil 1311. The liquid helium inlet/outlet pipes are supported and fixed on the support framework using helium pipe supports. The liquid helium inlet/outlet pipes 13133 mainly include the cryogenic piping and helium branch pipes. The cryogenic piping is connected to a cryogenic system, and the helium branch pipes are connected between windings of the superconducting coils. Insulators are incorporated into the liquid helium inlet/outlet pipes for electrical isolation between the cryogenic system and the toroidal field magnets, ensuring the safe operation of the cryogenic system. The first superconducting joints 13132, serving as joints for the superconducting coils 1311, are all provided inside the toroidal field terminal box 1313, and are designed in a double-box overlapping configuration. Each joint box consists of a joint box main body, a joint box cover plate, and the connection reinforcement blocks. The first superconducting joints 13132 further include joints connected to the feeder power supply system and joints connected between the windings.

The toroidal field circumferential supports 1314 consist of upper wing components, lower wing components 13142, and bottom circumferential supports 13143. The toroidal support components are composed of shear support plates, anti-shear square keys, and customized fixing bolts. The upper wing components 13141 and lower wing components 13142 consist of wing pressure plates, center hinge pins, and center bolts. Their common function is to connect the 16 toroidal field magnets 131 in the circumferential direction and restrain the slipping disturbance between the toroidal field magnets.

The toroidal field gravity supports 1315 are provided at the bottom of the toroidal field magnets 131 to bear the gravity of the magnets while connecting to the toroidal field magnets 131. The toroidal field gravity supports 1315 include toroidal field magnet support legs 13151, thermal barrier components 13152, and flexible supports 13153. The toroidal field magnet support legs 13151 are welded together with the arc sections of the outer U-shaped box components 13123 for the connection between the flexible supports 13153 and the toroidal field coil boxes 1312. The thermal barrier components 13152 consist of cooling plates, plugs, cooling pipe joints, and cooling pipes, and is configured for thermal isolation between the toroidal field magnets 131 and other bottom components. The flexible supports 13153 consist of several flexible support plates, locking blocks, screws, and anti-loosening nuts. The flexible support plates are fixedly connected together as a whole by locking blocks, screws, and anti-loosening nuts to absorb thermal strain during cooling.

Figure 7:
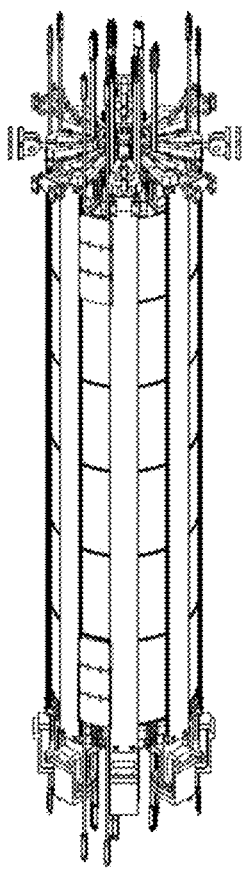
FIG. 7 is a schematic diagram of the structure of a central solenoid magnet according to an embodiment of the present disclosure.

The central solenoid magnet 133, as described in FIG. 7, can provide a large magnetic flux for plasma operation. To achieve this goal, the present disclosure adopts a method by stacking and nesting of high-temperature superconducting magnets and Nb3Sn superconducting magnets, with the inner side module of the central solenoid magnet stacked from high-temperature superconducting magnets and the outer side module stacked from Nb3Sn superconducting magnets (each module is independently powered). Cable-in-Conduit Conductors (CICC) are manufactured by inserting cables into stainless steel tube armor and then extruding them. Liquid helium can flow in the gaps between cables and the gaps between cables and stainless steel armor to cool the superconductor in the cable to the temperature of liquid helium. The length of a single conductor is no more than 1 kilometer in the existing manufacturing process for CICC, while the length of superconducting magnets for fusion reactors typically reaches several kilometers, thus requiring multiple conductors for winding. To save space, internal coaxial joints can be used for connection.

The first coil windings of the central solenoid magnet 133 consist of Nb3Sn windings on the outer side and high-temperature superconducting windings on the inner side. Specifically, the winding of the Nb3Sn windings starts from the outside and proceeds toward the inside, and during this process, it transits from the outer turn to the inner turn, with fillers being used in the transition region to fill the gaps. When the winding reaches the innermost part, the winding from the outside to the inside is about to end, and the conductors need to be lifted vertically to complete the transition between pancake windings. Fillers are also used in the transition region. After the above transition is completed, the winding of the Nb3Sn windings from the inside to the outside starts, and the process is similar to the winding from the outside to the inside. The winding of the inner high-temperature superconducting winding starts from the inside and proceeds toward the outside, and the winding process is similar to that of the Nb3Sn winding.

To cool off the central solenoid magnet 133, liquid helium is led into conductors through liquid helium inlet/outlet pipes and helium pipe joints of the windings. The helium pipe joints are provided on the conductor armor of the innermost and outermost layers in the winding's helical region, where helium holes are machined. Subsequently, the conductor's insulating layer is removed to reduce the flow resistance of the liquid helium. The helium pipes are then welded at the positions of the helium holes. To prevent damage or burning of the superconducting cables in the conductors due to excessive temperature during welding, the surface temperature of the superconducting cables is required to be lower than 200 degrees during welding.

The first joint assembly of the central solenoid magnet 133 can be divided into external joints (box-type joints) and internal joints (coaxial joints). The external joints are a box-type joint form and are configured to connect with the transmission feeder system. Each joint box consists of a joint box body, a joint box cover, and connecting reinforcement blocks. The internal joints are a coaxial joint structure configured to increase the length of the conductors. The internal connectors are sub-cable complementary splicing structures.

After the stacking and nesting of each module is completed, assembly commences. Assembly is mainly accomplished by a pre-compression mechanism, which primarily consists of axial pre-compression mechanisms, upper centering mechanisms, lower gravity support mechanisms, and cooling pipeline. The axial pre-compression mechanisms are configured to ensure the tightness between the plurality of high-temperature superconducting modules and the plurality of Nb3Sn superconducting modules, the upper centering mechanisms are configured to ensure the central alignment of the central solenoid magnet 133, the lower gravity support mechanisms are configured to support the central solenoid magnet 133, and the cooling pipeline is configured to cool the pre-compression system.

Figure 8:
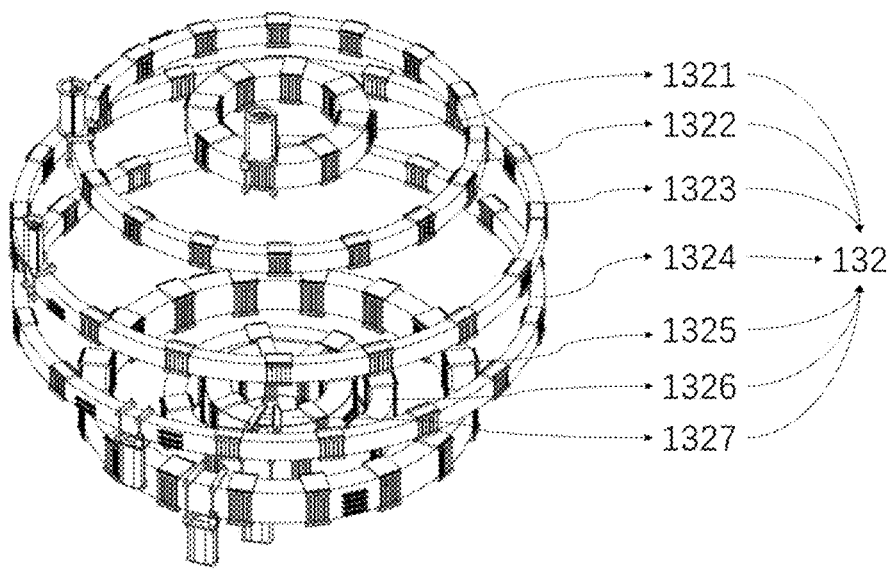
FIG. 8 is a schematic diagram of the structure of poloidal field magnets according to an embodiment of the present disclosure.

The poloidal field magnets 132, as described in FIG. 8, provide a large number of ampere-turns to effectively control the position and form of the plasma. To achieve this goal, the present disclosure adopts a multi-wind series connection method in which each CICC is configured to wind into winding for double-disk, four-disk, or six-disk coils structure. Each winding is connected in series through joints. CICC conductors are manufactured by threading cables into stainless steel tube armor and then extruding them into shape. Liquid helium can flow in the gaps between cables and the gaps between cables and stainless steel armor to cool the superconductor in the cable to the temperature of liquid helium. In the existing manufacturing process for CICC, the length of a single conductor is no more than 1 kilometer, while the length of superconducting magnets for fusion reactors typically reaches several kilometers, thus requiring multiple conductors for winding. Each conductor is wound into a winding unit, and then connected through joints for power supply. The poloidal field magnets 132, as shown in FIG. 8, include first poloidal field magnets 1321, second poloidal field magnets 1322, third poloidal field magnets 1323, fourth poloidal field magnets 1324, fifth poloidal field magnets 1325, sixth poloidal field magnets 1326, and seventh poloidal field magnets 1327, arranged sequentially from top to bottom.

The individual winding starts from the outside and proceeds toward the inside, and during this process, it transits from the outer turn to the inner turn with fillers being used in the transition region to fill the gaps. When the winding reaches the innermost part, the winding from the outside to the inside is about to end, and the conductors need to be lifted vertically to complete the transition between pancake windings. Fillers are also used in the transition region. After the above transition is completed, the winding from the inside to the outside starts, and the process is similar to the winding from the outside to the inside.

To cool off the poloidal field magnet 132, liquid helium is led into conductors through liquid helium inlet/outlet pipes and helium pipe joints of the windings. The helium pipe joints are provided on the conductor armor of the innermost and outermost layers in the winding's helical region, where helium holes are machined. Subsequently, the conductor's insulating layer is removed to reduce the flow resistance of the liquid helium. The helium pipes are then welded at the positions of the helium holes. To prevent damage or burning of the superconducting cables in the conductors due to excessive temperature during welding, temperature control is required during the welding process, ensuring that the surface temperature of the superconducting cables does not exceed 200° C.

After multiple winding units are completed, they are connected through joints. The joints are designed in a double-box overlapping form. Moreover, a single joint box consists of a joint box main body, a joint box cover plate, and connecting reinforcement blocks. The joint box main body is manufactured by processing after explosion welding and bending 316L stainless steel and bismuth-containing copper alloy. The joint box cover plate is made of 316L stainless steel. During welding, it is ensured that the surface temperature of the superconducting cable does not exceed 200 degrees.

The preparation steps for the superconducting cable at the overlap of the joint are as follows: remove the outermost armor of the conductor, then remove the tape layer, and finally remove the Ni or Cr layer on the surface of the superconducting cable. After the preparation is completed, the superconducting cable is placed in the assembled joint box for sealing welding.

After the winding assembly is completed, a complete coil is formed. The lead ends of the coil are located at the top and bottom-most coils. Each lead end needs to be fixed in the radial, axial, and circumferential directions. The "Tail" serves as the circumferential fixing component for the conductor. The "Tail" is located adjacent to the winding conductor terminals and joints. By mechanically connecting the lead-out ends of the outermost coil conductors to the secondary outer coil conductors and transferring the load from the tail of the outermost coil conductors to adjacent coils, the stress at the end of the conductors is reduced, and both of them are electrically insulated. This ensures that the lead ends of the coil conductor are in a relatively fixed position, thereby improving the stability of the conductor structure.

The lead-out ends of the coils, cooling pipeline, and related diagnostic signal lines will converge inside the poloidal field terminal boxes, and they are led out of the fusion reactor through connections with the transmission feeder system. The poloidal field terminal boxes mainly consist of frame components, internal support components, helium inlet/outlet pipes, and signal lines. The frame components primarily bear the gravitational and electromagnetic forces from the internal components of the feeder system while also protecting internal pipelines and joints. The internal support components are fixed connected to the underside of the winding housing through tooling fixtures and connected to G11 plates at the bottom, providing stable support for internal components such as the main helium pipes, superconducting joint boxes, and signal lines.

Figure 9:
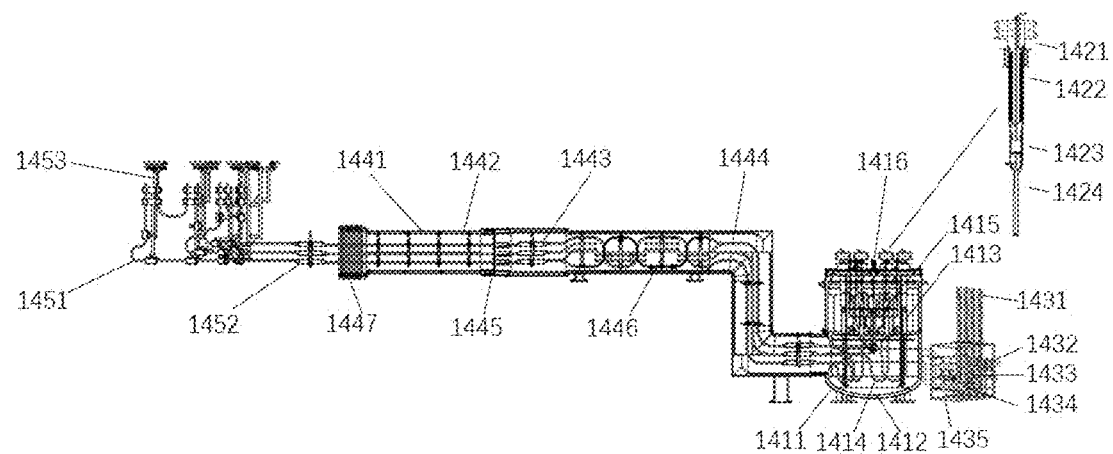
FIG. 9 is a schematic diagram of the structure of a transmission feeder system according to an embodiment of the present disclosure.

The transmission feeder system 14, as described in FIG. 9, is configured to provide with an independent power supply circuit for individual or individual groups of superconducting magnets in the magnetic confinement fusion reactor. The transmission feeder system comprises a signal collection channel. Independent feeders can be distributed around the device at any suitable location based on the number and position of superconducting magnets and the specific layout of the structure supporting the magnetic confinement fusion reactor/reactor device.

The transmission feeder system 14 consists of high-temperature superconducting current leads 142, magnet feeder terminal boxes 141, pressure relief valve assemblies 143, transition feeders 144, and inner feeders 145. The high-temperature superconducting current leads 142 integrate with the magnet feeder terminal boxes 141 across the atmospheric and vacuum interfaces, with the room temperature segments 1421 connected to the power supply system and the cryogenic superconducting segments 1424 connected to the low-temperature superconducting cables.

The magnet feeder terminal boxes 141 include terminal box outer Dewars 1411 and terminal box cold shields 1412. The terminal box outer Dewars 1411 provide joints for current lead, cryogenic valves, vacuum, sensors, cryogenic vacuum barriers, transition feeders, and pressure relief valve assemblies to connect to various interface systems.

The pressure relief valve assemblies 143 consist of heat exchangers 1431, control valve-safety valve components 1432, flowmeters 1433, differential pressure gauge-pressure gauge components 1434, and valve racks 1435. The pressure relief system primarily detects coolant flow, pressure, and other operational conditions in the pipeline and releases excessive pressure in the event of an accident to ensure the safe operation of the entire feeder system.

The transition feeders 144 include outer cylindrical shells 1441, first cold shields 1442, first superconducting joints 1443, first superconducting cables 1444, vacuum barriers 1445, first supports 1446, and seismic bellow tubes 1447. The transition feeders are used to connect the magnet feeder terminal boxes 1-901 to the inner feeders 1-905, with S-shaped cryogenic superconducting cables effectively absorbing mechanical stresses on the superconducting cables during cooling and operation of the magnet coils. The inner feeders 145 include second superconducting cables 1451 connected to the superconducting magnets, second superconducting joints 1452, and second supports 1453. One end of the inner feeders is connected to the transition feeders, and the other end (the second superconducting cables) is distributed according to the different positions of each individual or group of superconducting magnets in the magnetic confinement fusion reactor/reactor device and connected to the superconducting magnets.

Figure 10:
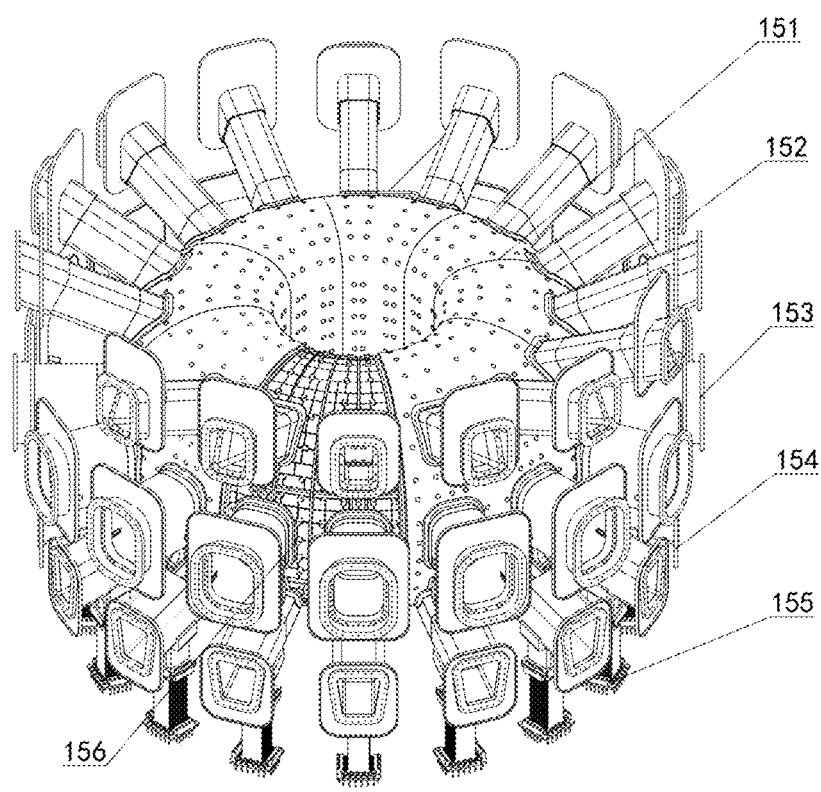
FIG. 10 is a schematic diagram of the structure of a vacuum chamber system according to an embodiment of the present disclosure.

The vacuum chamber system 15 described in FIG. 10 includes the vacuum chamber main body 151, upper windows 152, middle windows 153, lower windows 154, vacuum chamber gravity supports 155, and neutron shielding blocks 156. The vacuum chamber main body 151 is a double-layered shell structure with a D-shaped cross-section, and the space between the double layers of double-layered shell structure is filled with borated water and neutron shielding blocks to play a shielding role. Further, there are toroidal ribs and poloidal ribs between the double-layered shells to enhance structural strength. Due to the various numbers and sizes of holes in the toroidal rib plates, the flow distribution in the vacuum chamber is controlled, and a unique small-angle poloidal double-layered cooling system is created for efficient automatic heat dissipation and vacuum baking. The vacuum chamber is designed with three types of windows: upper windows 152, middle windows 153, and lower windows 154, providing channels accessing the plasma for diagnosis, heating, pumping, and internal component management.

The lower windows 154 of the vacuum chamber are designed with support pillars connected to the vacuum chamber gravity supports 155 through bolts. The gravity support adopts a flexible plate structure, which can absorb the thermal expansion and contraction displacement of the vacuum chamber main body. Additionally, neutron shielding blocks 156, consisting of high boron steel plates and ferromagnetic materials, are filled between the double-layered shells of the vacuum chamber main body 151. These neutron shielding blocks 156 are fixed on the poloidal ribs of the vacuum chamber, providing radiation protection for the superconducting magnets and reducing the ripple of the toroidal field.

Figure 11:
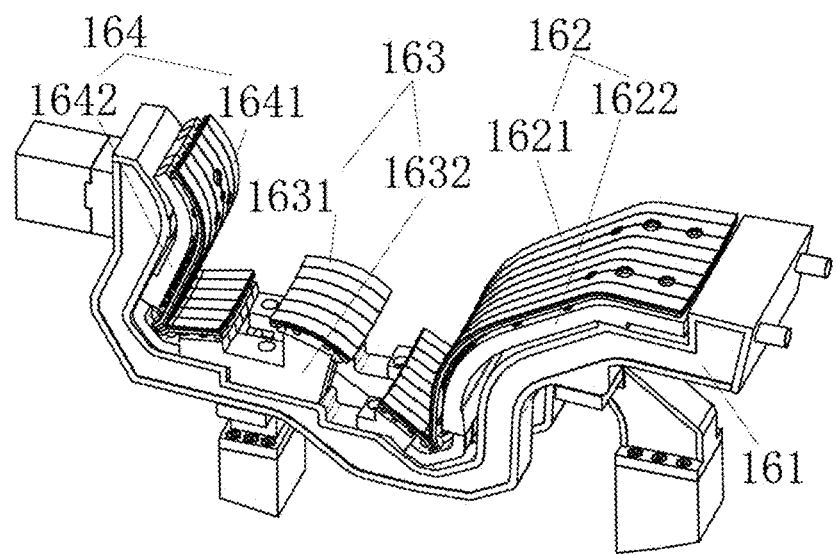
FIG. 11 is a schematic diagram of the structure of a divertor system according to an embodiment of the present disclosure.

The divertor system 15 is described in FIG. 11, and each divertor module includes a divertor cassette body 161, an outer target plate 162, a dome 163, and an inner target plate 164. The divertor cassette body 161 serves as the main load-bearing component to integrate the inner target plate 164, the dome 163, and the outer target plate 162 as a whole. The outer target plate 162, the dome 163, and the inner target plate 164 are collectively referred to as the plasma-facing components. The outer target plate 162 consists of first plasma-facing units 1621 and first transition supports 1622; the dome 163 consists of second plasma-facing units 1631 and second transition supports 1632; the inner target plate 164 consists of third plasma-facing units 1641 and third transition supports 1642. The connection between the first plasma-facing units 1621 and the first transition supports 1622 is fixed with dowel pins, and the connection between the first transition supports 1622 and the divertor cassette body 161 is made with bolts. The connection between the second plasma-facing units 1631 and the second transition supports 1632 is fixed with dowel pins, and the connection between the second transition supports 1632 and the divertor cassette body 161 is made with bolts. The connection between the third plasma-facing units 1641 and the third transition supports 1642 is fixed with dowel pins, and the connection between the third transition supports 1642 and the divertor cassette body 161 is made with bolts.

The third transition supports 1642 and the second transition supports 1632 are integrated, with the inner target plate 164 and the dome 163 sharing a transition support, to reduce the number of pipe cuts and bolt disassembly operations during remote operation. The third plasma-facing units 1641, the second plasma-facing units 1631, and the first plasma-facing units 1621 all adopt a flat plate structure. The internal channels in the high heat load area of the first plasma-facing units 1621 and the third plasma-facing units 1641 are a hypervapotron structure with longitudinal and transverse grooves, while the internal channels in other areas of the first plasma-facing units and the third plasma-facing units are a bare pipe structure. The internal channels of the second plasma-facing units are a bare pipe structure. The single divertor module adopts a "series-parallel-series" cooling method, where coolant flows through the divertor cassette body 161, then through the outer target plate 162, and finally through the inner target plate 164 and the dome 163 before exiting through the box body. Each divertor module utilizes inner support, middle support, and outer support arranged from left to right in FIG. 11, with transition blocks connecting them in the middle. The upper and lower surfaces of the transition blocks are machinable to compensate for assembly errors of the divertor modules. The lower structures of inner support, middle support, and outer support are fixedly connected to the vacuum chamber system.

Figure 12:
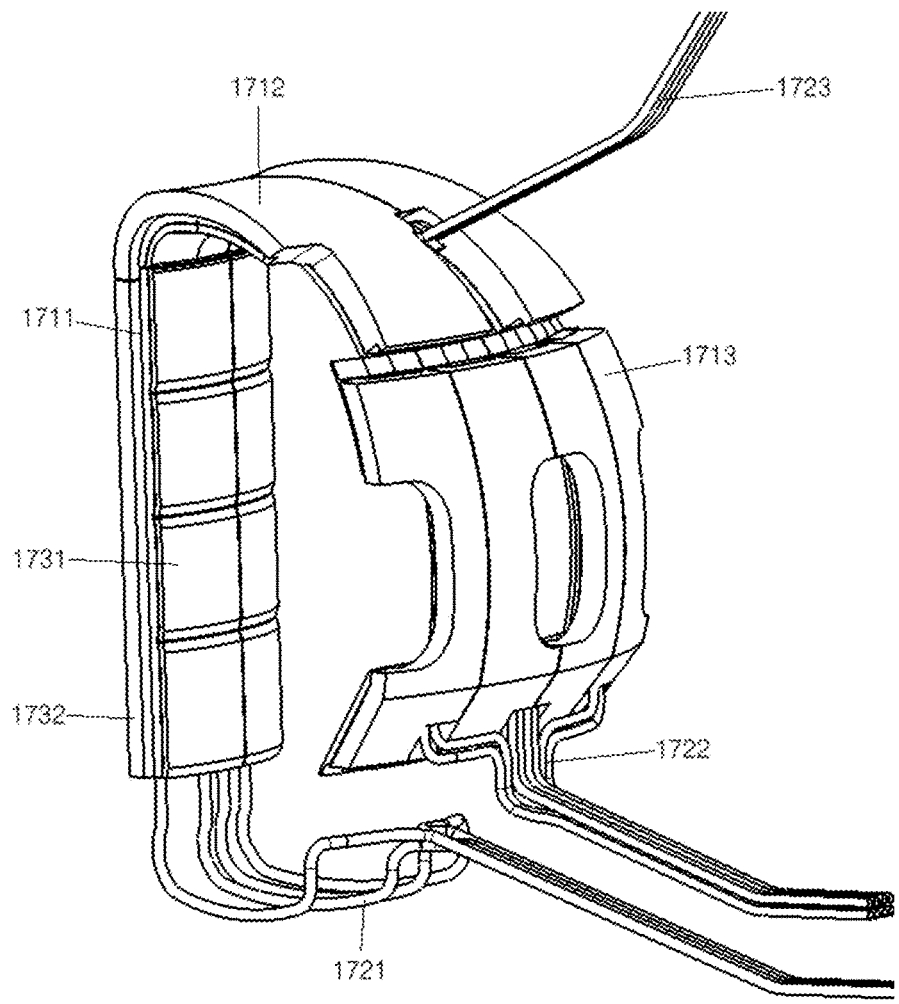
FIG. 12 is a schematic diagram of the structure of a cladding structure according to an embodiment of the present disclosure.

The blanket system 17, as described in FIG. 12, is divided into 16 sectors in the toroidal direction, each sector spanning 22.5°. The 16 sectors include 12 sectors composed of large modules and 4 sectors composed of small modules. The large module sectors are further divided into three sections in the poloidal direction, including the high-field side module, the top module, and the low-field side module. The low-field side module is subdivided into two smaller sectors in the toroidal direction, each with an angle of 11.25°. The small module sectors are also divided into three sections in the poloidal direction, including the high-field side sector formed by four small modules, the top sector formed by three small modules, and the low-field-side sector formed by three small modules. Each module is further subdivided into two smaller modules in the toroidal direction, each with an angle of 11.25°.

The blanket system 17 mainly consists of shield blanket modules provided on the inner wall of the vacuum chamber. The shield blanket is connected to the inner wall of the vacuum chamber through bolts and keys at the back, and maintenance of the blanket system, including lifting, installation, and disassembly, is carried out using the remote operation system 18.

The high-field side blankets 1711, low-field side blankets 1713, and top blankets 1712 are connected to the blanket piping. The blanket piping on the high-field-side and low-field-side are led out from the lower windows of the vacuum chamber, while the blanket piping on the top is led out from the upper oblique windows of the vacuum chamber. The blanket piping is fixedly connected to the inner wall of the vacuum chamber window through the pipe supports, which are designed with a certain displacement compensation capability to absorb the thermal deformation of the pipes during operation, ensuring the stable operation of the blanket piping. Vacuum sealing plates are provided on the interface of the blanket piping with the vacuum chamber windows, ensuring a high vacuum operating environment inside the vacuum chamber. A certain welding maintenance space is reserved at the interface of the blanket piping for maintenance by the remote operation system 18.

The blanket system 17 includes the main components facing the plasma, bearing high thermal loads and nuclear heat on the surface. To control the temperature of the blanket structure material within the allowable range, cooling channels are provided inside the blanket modules. The blanket modules are cooled by cooling water circulating through the channels, which are connected to the blanket piping. The heat generated internally is carried away through the circulation of cooling water, ensuring the stable operation of the blanket system.

Figure 13:
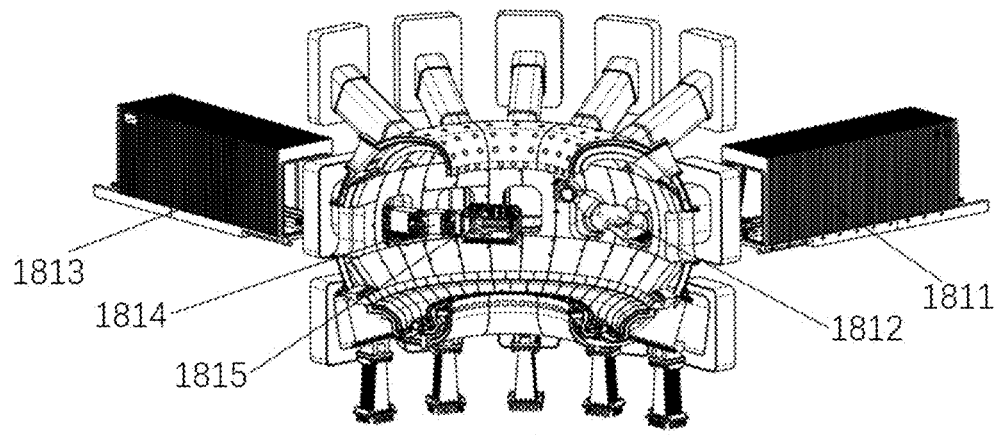
FIG. 13 is a schematic diagram of the structure of a remote operation system according to an embodiment of the present disclosure.

The remote operation system 18, as described in FIG. 13, is configured to maintain the internal components of the vacuum chamber, including the first wall of the divertor and the cladding molybdenum tiles. The operation arm 1812 moves in and out of the vacuum chamber along the track on the operation arm mounting base plate 1811. The transport arm 1814 moves in and out of the vacuum chamber along the track on the transport arm mounting base plate 1813. The operation arm and the transport arm are provided in the middle window of the vacuum chamber with an angle of 90 degrees relative to each other. The operation arm mounting base plate 1811 enters the neck tube of the middle window and locks with the neck tube through a locking mechanism to provide stable support for the operation arm 1812. Similarly, the transport arm mounting base plate 1813 enters the neck tube of the middle window and locks with the neck tube through a locking mechanism to provide stable support for the transport arm 1814. The tool deployment box 1815 is provided at the end of the transport arm 1814. The transport arm 1814 carries the tool deployment box 1815 into the vacuum chamber along the transport arm mounting base plate and adjusts the end to the desired position. The operation arm 1812 approaches the tool deployment box 1815 and docks with the actuator to grasp the end tool or move the internal components of the vacuum chamber. The tool deployment box 1815 adjusts the carried actuators, tools, or components according to the task requirements.

The window plugin operation sub-system includes multi-degree-of-freedom robotic arms, actuator tools, and window plugin transport mechanisms. The multi-degree-of-freedom robotic arms are configured for transporting the actuator tools for operation and transferring the vacuum chamber sealing mechanisms into the transfer main body. The window plugin transfer mechanisms are provided on the upper-layer movable platform, with docking and locking mechanisms designed at the front end to dock with the window plugin and drag it into the transfer main body.

The transfer sub-system can seal and transfer components and remote maintenance equipment contaminated by radiation by remote control. The transfer main body includes the main body sealed car body, double sealed door structure, double-layered movable platform, and piping service system. The main body sealed car body is a rectangular shell structure, providing a vacuum sealing environment for maintenance. The double sealed door structure is provided at the front end of the main body sealed car body to dock with the docking mechanisms sealing door. It can be opened and moved to the upper part of the main body sealed car body to create a sealed door space between the transfer main body, docking mechanisms, and vacuum chamber window. The double-layered movable platform is provided at the lower part of the main body sealed car body. The lower-layer movable platform is driven by motors, gears, and racks to transport the upper-layer movable platform to dock with the vacuum chamber window. The upper-layer movable platform provides docking rails and moving mechanisms, and the moving mechanism can move along the docking rails to the windows of the vacuum chamber. The piping service system is provided on both sides and the top of the main body sealed car body, providing inputs of water, electricity, gas, and control for the main body of the transport vehicle. The docking mechanisms consist of sealed docking channels and docking guiding mechanisms. One end of the sealed docking channel is a flange surface and is connected to the flange of the window of the vacuum chamber through a fluororubber sealing ring, and the other end is a sealed door structure and can dock with the transfer main body. The two ends are connected through flexible bellows tubes. The docking guiding mechanism is provided inside the window of the vacuum chamber and the biological shielding layer channel, consisting of two rail segments. The transfer sub-system includes a full-degree-of-freedom steering function, enabling remote wireless control of the transfer main body for transportation operations inside the reactor.

In summary, the magnetic confinement fusion reactor of the present disclosure provides a method for designing a fusion reactor poloidal field magnet system based on CICC. By multi-wind series design, the turns of the coil are increased, while the cooling circuit of the coil can be shortened, effectively improving the safety, stability, and cost-effectiveness of the fusion reactor magnet system. With independent process and assembly, the feeder lines provided by the present disclosure do not interfere with each other, and their installation positions can be arranged at the most suitable positions for connection with the corresponding magnets, reducing assembly difficulty and saving internal connection space of the device. They can also be distributed on different levels of the building according to the layout of the building, which is conducive to daily maintenance. The vacuum chamber system in the present disclosure is a large and sophisticated double-layered nuclear pressure vessel with resistance to radiation, long lifespan, high vacuum, and multiple dynamic loads. The internal design uses small-angle poloidal double-layered cooling channels, which can achieve efficient automatic heat dissipation and vacuum baking. The neutron shielding blocks can minimize the damage of high-energy fusion neutrons to superconducting magnets and reduce the ripple of the toroidal magnetic field.

Described above are only some preferred embodiments of the present application, which are not intended to limit the present application. It should be noted that various improvements, modifications and replacements made by those skilled in the art without departing from the spirit and scope of the present application shall fall within the scope of the present application defined by the appended claims.

What is claimed is:

1. A magnetic confinement fusion reactor, comprising:
a Dewar system;
a cold shield system;
a superconducting magnet system;
a vacuum chamber system;
a divertor system;
a blanket system; and
a remote operation system;
wherein the Dewar system, the cold shield system, the superconducting magnet system, the vacuum chamber system, the divertor system, the blanket system, and the remote operation system are provided in a host hall of the magnetic confinement fusion reactor, and together constitute a host of the magnetic confinement fusion reactor;
the superconducting magnet system comprises a central solenoid magnet, a poloidal field magnet, and a toroidal field magnet;
the central solenoid magnet is configured to provide necessary volt-seconds to generate, establish, and maintain a plasma current by current variations;
the poloidal field magnet is configured to generate a poloidal magnetic field to control a cross-sectional shape and position equilibrium of a plasma;
the toroidal field magnet is configured to generate a toroidal magnetic field to ensure macroscopic stability of the plasma;
the toroidal magnetic field and a poloidal magnetic field generated by the plasma current are configured to confine the plasma;
the Dewar system and the cold shield system are configured to provide a vacuum and cryogenic environment for the superconducting magnet system;
the vacuum chamber system is configured to create a clean and vacuum environment for stable operation of the plasma, and reduce nuclear heating deposition on the superconducting magnet system and environmental contamination induced by fusion neutrons;
the divertor system is configured to block impurities from a vessel wall, reducing contamination to the plasma in a central area, and discharge particle and heat flow from the plasma in the central area as well as helium ash generated during a fusion reaction;
the divertor system and the blanket system are provided inside the vacuum chamber system;
the remote operation system comprises at least one arm that is movable in and out of the vacuum chamber system;
an energy carried by the fusion neutrons is configured to be deposited in the blanket system, then carried by a coolant to an exterior of the magnetic confinement fusion reactor;
the fusion neutrons are configured to undergo a nuclear reaction with a tritium breeder to produce tritium for fusion fuel supplement;
the toroidal field magnet comprises a superconducting coil, a coil box, a first terminal box, a circumferential support, a first gravity support and 16 sector-shaped superconducting magnets; wherein the 16 sector-shaped superconducting magnets are configured to generate the toroidal magnetic field to confine the plasma;

the superconducting coil consists of a plurality of D-shaped coil windings; each of the plurality of D-shaped coil windings comprises a first winding and a second winding; wherein a magnetic field intensity of the first winding is lower than that of the second winding; the first winding consists of two six-pancake sub-windings formed by winding of an Nb3Sn conductor; the second winding consists of one twelve-pancake coil sub-winding formed by winding of the Nb3Sn conductor; and the first winding and the second winding are connected in series through a first superconducting joint; and the coil box is D-shaped, and comprises an inner U-shaped box component, an inner sealing cover plate, an outer U-shaped box component and an outer sealing cover plate; wherein a straight section of each of the inner U-shaped box component and the inner sealing cover plate is made of N50 stainless steel; and an arc section of each of the inner U-shaped box component, the inner sealing cover plate, the outer U-shaped box component, and the outer sealing cover plate is made of 316LN stainless steel.

2. The magnetic confinement fusion reactor of claim 1, wherein the Dewar system comprises:
   a top cover assembly;
   a ring body assembly;
   a base assembly;
   a bellow tube assembly;
   a support assembly; and
   a venting assembly;
   wherein the top cover assembly is fixedly connected with the ring body assembly through a vacuum sealed structure;
   the ring body assembly is weldedly connected to the base assembly;
   the bellow tube assembly is weldedly connected to the ring body assembly;
   the base assembly is provided on the support assembly; and
   an outer edge of the base assembly is fixedly connected to an external building.

3. The magnetic confinement fusion reactor of claim 2, wherein the top cover assembly is an elliptical head structure;
   a circumferential reinforcement rib and a radial reinforcement rib are provided on an inner side of the top cover assembly; and
   a top of the top cover assembly is provided with a plurality of installation channels and a plurality of maintenance channels.

4. The magnetic confinement fusion reactor of claim 2, wherein the ring body assembly has a straight-cylinder structure;
   a circumferential reinforcement rib and a radial reinforcement rib are provided on an outer side of the ring body assembly; and
   the ring body assembly is provided with a plurality of first connection channels along a height direction and a plurality of second connection channels along a circumferential direction.

5. The magnetic confinement fusion reactor of claim 2, wherein the base assembly is a straight-cylinder structure with a skirt edge portion;
   an inner side of the skirt edge portion is circumferentially provided with a structure in support connection with the superconducting magnet system and the vacuum chamber system; and
   the straight-cylinder structure is provided with a plurality of first connection channels along a height direction and a plurality of second connection channels along a circumferential direction.

6. The magnetic confinement fusion reactor of claim 2, wherein the venting assembly comprises:
   a relief valve;
   a bursting component; and
   a venting pipeline;
   wherein the relief valve, the bursting component, and the venting pipeline are configured to achieve pressure relief in response to the occurrence of helium leakage in the Dewar system.

7. The magnetic confinement fusion reactor of claim 1, wherein the cold shield system is configured to be divided into a plurality of cold shield sectors along a circumferential direction; and
   adjacent cold shield sectors among the plurality of cold shield sectors are connected through a first insulation gasket.

8. The magnetic confinement fusion reactor of claim 7, wherein each of the plurality of cold shield sectors comprises a plurality of cooling panels; and adjacent cooling panels among the plurality of cooling panels are connected through a second insulation gasket.

9. The magnetic confinement fusion reactor of claim 8, wherein each of the plurality of cooling panels is welded with a serpentine cooling pipe.

10. The magnetic confinement fusion reactor of claim 1, wherein the cold shield system has a polished and silver-plated surface.

11. The magnetic confinement fusion reactor of claim 1, wherein a cooling pipe is provided inside the coil box.

12. The magnetic confinement fusion reactor of claim 1, wherein the first terminal box comprises:
    a support frame;
    a second superconducting joint; and
    a liquid helium pipeline;
    wherein the liquid helium pipeline comprises:
    a cryogenic pipe; and
    a helium branch;
    wherein the cryogenic pipe is connected to a cryogenic system;
    the helium branch is connected between windings of the superconducting coil; and
    the liquid helium pipeline is provided with an insulator.

13. The magnetic confinement fusion reactor of claim 1, wherein the circumferential support comprises:
    a shear support plate;
    an anti-shear square key;
    a bolt;
    an upper wing component; and
    a lower wing component;
    wherein the shear support plate, the anti-shear square key, the bolt, the upper wing component, and the lower wing component are configured to connect the 16 sector-shaped superconducting magnets in a circumferential direction, and restrain a slippage disturbance between the 16 sector-shaped superconducting magnets.

14. The magnetic confinement fusion reactor of claim 1, wherein the first gravity support is provided at a bottom of the toroidal field magnet to bear the toroidal field magnet;
    the first gravity support comprises:

a support leg for supporting the toroidal field magnet;
an insulation pad;
a thermal barrier component; and
a flexible support;
wherein a plurality of cooling pipes are provided inside the thermal barrier component; and
the flexible support consists of a plurality of flexible support plates.

15. The magnetic confinement fusion reactor of claim 1, wherein the central solenoid magnet is formed by stacking of a plurality of solenoid coils;
the plurality of solenoid coils are configured to provide magnetic flux required for breakdown of the plasma; and
the central solenoid magnet is configured to cooperate with the poloidal field magnet to heat and shape the plasma.

16. The magnetic confinement fusion reactor of claim 1, wherein the central solenoid magnet is an annular superconducting coil wound with Cable-in-Conduit Conductors (CICC); and
one part of the central solenoid magnet is made of a high-temperature superconductor, and the other part of the central solenoid magnet is made of an Nb3Sn superconductor.

17. The magnetic confinement fusion reactor of claim 1, wherein the central solenoid magnet comprises:
a coil winding;
a joint assembly;
a cooling structure; and
a pre-compression system;
wherein the coil winding comprises a plurality of high-temperature superconducting modules and a plurality of Nb3Sn superconducting modules; and
each of the plurality of high-temperature superconducting modules and the plurality of Nb3Sn superconducting modules is made by tension-free winding.

18. The magnetic confinement fusion reactor of claim 17, wherein transition insulation is provided between conductors.

19. The magnetic confinement fusion reactor of claim 17, wherein a terminal of each of the plurality of high-temperature superconducting modules is led out from an inner side of the central solenoid magnet;
a terminal of each of the plurality of Nb3Sn superconducting modules is led out from an outer side of the central solenoid magnet; and
the terminal of each of the plurality of high-temperature superconducting modules and the terminal of each of the plurality of Nb3Sn superconducting modules are connected to a feeder system respectively from upper and lower ends of the central solenoid magnet.

20. The magnetic confinement fusion reactor of claim 17, wherein the joint assembly comprises:
a first joint; and
a second joint;
wherein the first joint is connected to a feeder line;
the second joint is coaxially provided inside the coil winding; and
the cooling structure is configured to cool the central solenoid magnet with liquid helium.

21. The magnetic confinement fusion reactor of claim 17, wherein the pre-compression system comprises:
an axial pre-compression mechanism;
an upper centering mechanism;
a lower gravity support mechanism; and
a cooling pipeline;

wherein the axial pre-compression mechanism is configured to compact the plurality of high-temperature superconducting modules and the plurality of Nb3Sn superconducting modules;
the upper centering mechanism is configured to center the central solenoid magnet;
the lower gravity support mechanism is configured to support the central solenoid magnet; and
the cooling pipeline is configured to cool the pre-compression system.

22. The magnetic confinement fusion reactor of claim 1, wherein the poloidal field magnet comprises:
a plurality of annular coils surrounding the toroidal field magnet;
the plurality of annular coils are configured to provide the poloidal magnetic field for controlling configuration of the plasma; and
the central solenoid magnet and the poloidal field magnet are configured to work together to heat and shape the plasma.

23. The magnetic confinement fusion reactor of claim 22, wherein the poloidal field magnet is an annular superconducting coil wound with a Cable-in-Conduit Conductor (CICC); and
one part of the poloidal field magnet is made of a NbTi superconductor, and the other part of the poloidal field magnet is made of a Nb3Sn superconductor.

24. The magnetic confinement fusion reactor of claim 22, wherein the poloidal field magnet comprises:
a coil winding;
a helium pipe;
a joint;
a tail structure; and
a second terminal box;
wherein the coil winding is formed by series connection of a plurality of double-disk, four-disk, or six-disk coils through the joint; and
each unit of the coil winding is wound with a single conductor wire using a tension-free winding method.

25. The magnetic confinement fusion reactor of claim 24, wherein transition insulation is provided between conductors and ground insulation is provided on an outer side of the magnetic confinement fusion reactor.

26. The magnetic confinement fusion reactor of claim 24, wherein the helium pipe is provided at an inter-disk transition region to introduce liquid helium into conductors for cooling superconducting wires.

27. The magnetic confinement fusion reactor of claim 24, wherein two lead-out ends of the coil winding are each provided with the tail structure to enhance strength of the two lead-out ends to withstand a circumferential stress of the coil winding.

28. The magnetic confinement fusion reactor of claim 24, wherein lead-out ends of the coil winding, the helium pipe and measurement lines are configured to converge in the second terminal box, and be connected to a feeder line and led to an exterior of the magnetic confinement fusion reactor.

29. The magnetic confinement fusion reactor of claim 1, wherein the magnetic confinement fusion reactor further comprises:
a transmission feeder system;
wherein the transmission feeder system is provided with an independent power supply circuit for the central solenoid magnet, the poloidal field magnet and the toroidal field magnet in the magnetic confinement fusion reactor;

the transmission feeder system comprises a signal collection channel; and the transmission feeder system is led from an outside of the magnetic confinement fusion reactor and connected to the superconducting magnet system.

30. The magnetic confinement fusion reactor of claim 29, wherein the transmission feeder system comprises:
a magnet feeder terminal box;
a pressure relief valve assembly;
a transition feeder; and
an inner feeder.

31. The magnetic confinement fusion reactor of claim 30, wherein the magnet feeder terminal box comprises:
an outer Dewar;
a cold shield;
a superconducting current lead;
a second superconducting joint;
a superconducting cable;
a cryogenic transfer pipe; and
a cryogenic valve component.

32. The magnetic confinement fusion reactor of claim 30, wherein the pressure relief valve assembly comprises:
a heat exchanger;
a control valve-safety valve component;
a flowmeter;
a differential pressure gauge-pressure gauge component; and
a valve rack.

33. The magnetic confinement fusion reactor of claim 30, wherein the transition feeder comprises:
an outer cylindrical shell;
a cold shield;
a second superconducting joint;
a superconducting cable;
a vacuum barrier;
a support; and
a seismic bellow tube.

34. The magnetic confinement fusion reactor of claim 30, wherein the inner feeder comprises:
a superconducting cable;
a second superconducting joint; and
a support.

35. The magnetic confinement fusion reactor of claim 31, wherein the outer Dewar is a two-segment cylindrical shell made of stainless steel;
the cold shield is provided inside the two-segment cylindrical shell;
a cooling pipe and multiple layers of heat insulation are provided on the cold shield;
the two-segment cylindrical shell is provided with an aviation plug interface for connection with pressure, temperature, voltage, and vacuum sensors in the transition feeder and the inner feeder;
the two-segment cylindrical shell is further provided with a flange hole in which the superconducting current lead is provided vertically;
the superconducting current lead is connected to the second superconducting joint on a superconducting cable with a shape of "S" or "U" through a current lead joint box; and
the cryogenic valve component is provided on the two-segment cylindrical shell through a flange to control a 80K coolant loop of the cold shield, a 50K coolant input and a 300K coolant output of the superconducting current lead, and a 4.5K coolant output of the superconducting cable and the superconducting current lead.

36. The magnetic confinement fusion reactor of claim 31, wherein the superconducting current lead comprises:
a room temperature segment;
a heat-exchange segment;
a high-temperature superconducting segment; and
a cryogenic superconducting segment;
wherein the room temperature segment comprises a water-cooling row and an insulated flange;
the water-cooling row is connected to a power supply system;
the insulated flange is connected to the magnet feeder terminal box;
the heat-exchange segment has a fin structure made of oxygen-free copper;
a working temperature of the high-temperature superconducting segment is 5K-65K;
the high-temperature superconducting segment is configured to be cooled by conduction; and
a first end of a cryogenic superconducting cable in the cryogenic superconducting segment is welded to the high-temperature superconducting segment, and a second end of the cryogenic superconducting cable is connected to a joint box.

37. The magnetic confinement fusion reactor of claim 32, wherein the heat exchanger is configured to make a temperature of a coolant gas at a 300K outlet of the superconducting current lead to ambient temperature to achieve valve protection;
the control valve-safety valve component is configured to release excessive pipe pressure in the case of an accident to ensure safe operation of the transmission feeder system;
the flowmeter is configured to collect and calculate a real-time flow rate;
the pressure differential gauge-pressure gauge component is configured to monitor pipeline operation; and
the valve rack is a frame structure to support the heat exchanger, the control valve-safety valve component, the flowmeter, the differential pressure gauge-pressure gauge component.

38. The magnetic confinement fusion reactor of claim 33, wherein the transition feeder is provided with an S-shaped cryogenic superconducting cable to absorb mechanical stress applied to the superconducting cable during magnet coil cooling and operation.

39. The magnetic confinement fusion reactor of claim 1, wherein the vacuum chamber system comprises:
a vacuum chamber main body;
an upper window;
a middle window;
a lower window;
a second gravity support; and
a neutron shielding block.

40. The magnetic confinement fusion reactor of claim 39, wherein the vacuum chamber system is provided inside the superconducting magnet system, and is configured to provide support for internal components and window plugins;
the vacuum chamber system has a vacuum cavity structure which is configured to offer a vacuum environment for plasma operation, and also provide a first-layer confinement barrier against tritium and activated dust.

41. The magnetic confinement fusion reactor of claim 39, wherein the vacuum chamber main body is a double-layered shell structure with a D-shaped cross-section; and
a space between double layers of the double-layered shell structure is filled with borated water and the neutron shielding block.

42. The magnetic confinement fusion reactor of claim 39, wherein the upper window, the middle window, and the lower window are configured to provide a channel accessing the plasma for diagnosis, heating, pumping, and internal component management.

43. The magnetic confinement fusion reactor of claim 39, wherein the second gravity support is a flexible plate structure to absorb a thermal expansion and contraction displacement of the vacuum chamber main body.

44. The magnetic confinement fusion reactor of claim 1, wherein the divertor system is provided inside the vacuum chamber system; and
the divertor system comprises a plurality of divertor modules and a divertor piping.

45. The magnetic confinement fusion reactor of claim 44, wherein each of the plurality of divertor modules comprises:
a cassette body;
an outer target plate;
a dome; and
an inner target plate;
wherein the cassette body is configured to serve as a main load-bearing component to integrate the inner target plate, the dome, and the outer target plate into a whole;
the outer target plate consists of a first plasma-facing unit and a first transition support;
the dome consists of a second plasma-facing unit and a second transition support; and
the inner target plate consists of a third plasma-facing unit and a third transition support.

46. The magnetic confinement fusion reactor of claim 45, wherein the first plasma-facing unit, the second plasma-facing unit, and the third plasma-facing unit each have a flat plate structure;
the first plasma-facing unit is provided with a first internal flow channel; the second plasma-facing unit is provided with a second internal flow channel; the third plasma-facing unit is provided with a third internal flow channel; a part of the first internal flow channel is within a thermal load area of the first plasma-facing unit and a part of the third internal flow channel within a thermal load area of the third plasma-facing unit, each have a hypervapotron structure with longitudinal and transverse grooves; and a remaining part of the first internal flow channel, a remaining part of the third internal flow channel and the second internal flow channel each has a pipe structure.

47. The magnetic confinement fusion reactor of claim 44, wherein each of the plurality of divertor modules comprises an inner support, a middle support, and an outer support that are connected by a transition block;
upper and lower surfaces of the transition block are machinable to compensate for an assembly error of each of the plurality of divertor modules; and
a lower structure of each of the inner support, the middle support, and the outer support is fixedly connected to the vacuum chamber system.

48. The magnetic confinement fusion reactor of claim 44, wherein the divertor piping consists of inlet and outlet cooling pipes of the plurality of divertor modules and pipe clamps thereof.

49. The magnetic confinement fusion reactor of claim 1, wherein the blanket system is provided inside the vacuum chamber system, and is configured to directly face the plasma.

50. The magnetic confinement fusion reactor of claim 49, wherein the blanket system comprises:
a top blanket;
a high-field side blanket;
a low-field side blanket; and
a blanket piping;
wherein each of the top blanket, the high-field side blanket and the low-field side blanket consists of a first wall and a shielding block.

51. The magnetic confinement fusion reactor of claim 1, wherein the remote operation system comprises:
an internal component operation sub-system;
a window plugin operation sub-system; and
a transfer sub-system.

52. The magnetic confinement fusion reactor of claim 51, wherein the internal component operation sub-system comprises:
an operation arm transfer cask;
an operation arm main body;
a transport arm transfer cask;
a transport arm main body; and
a tool deployment box;
wherein the operation arm main body and the transport arm main body are provided in a middle window of a vacuum chamber with an angle of 90 degrees relative to each other;
the operation arm main body is docked with an actuator inside the tool deployment box through a coupling, and is configured to hold and operate a tool inside the tool deployment box or transport a component in the vacuum chamber through the actuator; and
the transport arm transfer cask is configured to provide storage space for the actuator and tool required by the operation arm main body for maintenance of the component in the vacuum chamber.

53. The magnetic confinement fusion reactor of claim 51, wherein the window plugin operation sub-system comprises:
a multi-degree-of-freedom robotic arm;
an actuator tool; and
a window plugin transfer mechanism.

54. The magnetic confinement fusion reactor of claim 51, wherein the transfer sub-system comprises:
a transfer main body;
a docking mechanism; and
a transport unit;
wherein an inside of the transfer main body is provided with a double-layered movable platform structure comprising a lower-layer movable platform and an upper-layer movable platform;
the lower-layer movable platform is configured to transport the upper-layer movable platform to be docked to a rail of a vacuum chamber;
the upper-layer movable platform is configured to integrate the window plugin operation sub-system to a window of the vacuum chamber along the rail, remove a vacuum chamber sealing mechanism, replace a window plugin maintenance actuator to remove a window plugin, and drag the window plugin along the rail into the transfer main body; and
after a double-sealed door in the transfer main body is closed, the transfer main body is configured, in response to a case that the window plugin reaches the transfer main body, to close a double-sealed door, be disengaged from the docking mechanism, and be transported by the transport unit to a hot cell docking area.

55. The magnetic confinement fusion reactor of claim 1, wherein the magnetic confinement fusion reactor further comprises:
a host assembly system;

wherein the host assembly system comprises:
a pre-assembly tool;
an assembly tool;
an assembly reference grid and alignment measurement system;
a welding and non-destructive testing system;
a vacuum leak detection system; and
an insulation and voltage testing system.

56. The magnetic confinement fusion reactor of claim 55, wherein the pre-assembly tool is configured for assembling, splicing, and testing components of the host of the magnetic confinement fusion reactor in a pre-assembly hall; and
the pre-assembly tool comprises:
a ⅛ vacuum chamber assembly platform;
a central solenoid magnet assembly platform;
a Dewar base assembly welding platform;
a temporary support tool for component testing;
a toroidal field magnet rotating tooling; and
a vacuum chamber rotating tooling.

57. The magnetic confinement fusion reactor of claim 55, wherein the assembly tool is configured for lifting, positioning, welding, and testing components of the host of the magnetic confinement fusion reactor in the host hall;
the assembly tool comprises:
a Dewar base lifting tool;
a poloidal field magnet lifting tool;
a temporary support and lifting platform for supporting and lifting the central solenoid magnet, the toroidal field magnet and poloidal field magnet;
a temporary support and lifting tool for a vacuum chamber;
a toroidal field magnet rotation tooling;
a blanket transport and lifting tooling;
a ⅛ sector lifting and positioning tooling; and
a temporary support.

58. The magnetic confinement fusion reactor of claim 55, wherein the assembly reference grid and alignment measurement system is configured to provide assembly reference and alignment measurement for assembly and positioning of components of the host of the magnetic confinement fusion reactor.

59. The magnetic confinement fusion reactor of claim 55, wherein the welding and non-destructive testing system is configured to provide welding and defect detection for assembly welds of components of the host of the magnetic confinement fusion reactor.

60. The magnetic confinement fusion reactor of claim 55, wherein the vacuum leak detection system is configured to provide vacuum leak detection for assembly of components of the host of the magnetic confinement fusion reactor.

61. The magnetic confinement fusion reactor of claim 55, wherein the insulation and voltage testing system is configured to provide insulated assembly and voltage testing for magnets and feeder components of the host of the magnetic confinement fusion reactor.

62. The magnetic confinement fusion reactor of claim 1, wherein the host hall is divided into five floors consisting of L1, L2, L3, B1, and B2;
the host of the magnetic confinement fusion reactor penetrates through the five floors; and
a concrete biological shielding layer with a thickness of two meters is provided for protecting the host of the magnetic confinement fusion reactor.

* * * * *